us010097047B2

United States Patent
Yamamoto et al.

(10) Patent No.: US 10,097,047 B2
(45) Date of Patent: Oct. 9, 2018

(54) WIRELESS POWER TRANSMISSION SYSTEM AND POWER TRANSMISSION DEVICE OF WIRELESS POWER TRANSMISSION SYSTEM

(71) Applicant: PANASONIC INTELLECTUAL PROPERTY MANAGEMENT CO., LTD., Osaka (JP)

(72) Inventors: Hiroshi Yamamoto, Osaka (JP); Kenichi Asanuma, Kyoto (JP); Tsutomu Sakata, Osaka (JP); Hiroshi Kanno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/628,772

(22) Filed: Jun. 21, 2017

(65) Prior Publication Data
US 2017/0288412 A1    Oct. 5, 2017

Related U.S. Application Data

(63) Continuation of application No. 14/712,775, filed on May 14, 2015, now Pat. No. 9,728,982.

(30) Foreign Application Priority Data

May 27, 2014  (JP) ................................. 2014-108817

(51) Int. Cl.
*H01F 27/42* (2006.01)
*H01F 37/00* (2006.01)
(Continued)

(52) U.S. Cl.
CPC ............... *H02J 50/12* (2016.02); *G01V 3/10* (2013.01); *H02J 5/005* (2013.01); *H02J 7/025* (2013.01);
(Continued)

(58) Field of Classification Search
USPC ...................................... 307/7, 104
See application file for complete search history.

(56) References Cited

U.S. PATENT DOCUMENTS 9,837,826 B2 * 12/2017 Park ..................... H02J 50/12
2009/0001932 A1 1/2009 Kamijo et al.
(Continued)

FOREIGN PATENT DOCUMENTS

JP  2009-011129  1/2009
JP  2012-016171  1/2012
(Continued)

OTHER PUBLICATIONS

Extended European Search Report dated Nov. 3, 2015 for European Patent Application No. 15168502.1.
(Continued)

*Primary Examiner* — Adam Houston
(74) *Attorney, Agent, or Firm* — Greenblum & Bernstein, P.L.C.

(57) ABSTRACT

A power transmission device includes an inverter using a frequency f11 lower than a frequency f0 between a first resonator and a second resonator or a frequency f12 higher than the frequency f0 to generate a first power; an oscillator using a frequency f10 lower than a frequency fr between the first resonator and the second resonator or a frequency f20 higher than the frequency fr to generate a second power; and a power transmission control circuitry setting a foreign object detection period between first and second transmission periods, using the frequency f11 or frequency f12 in the first transmission period, using the frequency f10 or frequency f20 in the foreign object detection period, and if it is determined that a substance is present in the foreign object detection period, transmitting power in the second transmis-
(Continued)

sion period at a frequency different from the frequency used in the first transmission period.

14 Claims, 16 Drawing Sheets

(51) Int. Cl.
H01F 38/00 (2006.01)
H02J 50/12 (2016.01)
G01V 3/10 (2006.01)
H02J 50/60 (2016.01)
H02J 50/40 (2016.01)
H02J 50/70 (2016.01)
H02J 7/02 (2016.01)
H02J 5/00 (2016.01)
H02J 17/00 (2006.01)

(52) U.S. Cl.
CPC .............. *H02J 17/00* (2013.01); *H02J 50/40* (2016.02); *H02J 50/60* (2016.02); *H02J 50/70* (2016.02)

(56) References Cited

U.S. PATENT DOCUMENTS

| | | | |
|---|---|---|---|
| 2010/0066176 A1 | 3/2010 | Azancot et al. | |
| 2010/0237709 A1 | 9/2010 | Hall | |
| 2012/0001493 A1 | 1/2012 | Kudo et al. | |
| 2012/0112531 A1 | 5/2012 | Kesler | |
| 2012/0242285 A1 | 9/2012 | Jung | |
| 2012/0280575 A1* | 11/2012 | Kim | H02J 17/00 307/104 |
| 2012/0326499 A1* | 12/2012 | Ichikawa | B60L 11/182 307/9.1 |
| 2013/0057364 A1 | 3/2013 | Kesler | |
| 2013/0093253 A1* | 4/2013 | Norconk | H02J 5/005 307/104 |
| 2014/0159501 A1* | 6/2014 | Kanno | H02J 17/00 307/104 |
| 2014/0375139 A1* | 12/2014 | Tsukamoto | H02J 7/025 307/104 |
| 2015/0091510 A1 | 4/2015 | Iwawaki et al. | |
| 2015/0162752 A1 | 6/2015 | Endo | |
| 2015/0236518 A1* | 8/2015 | Matsumoto | H02J 17/00 307/104 |
| 2015/0349542 A1* | 12/2015 | Yamamoto | G01V 3/10 307/104 |
| 2016/0064951 A1* | 3/2016 | Yamamoto | H02J 17/00 307/104 |
| 2016/0118806 A1 | 4/2016 | Standke | |
| 2016/0231364 A1 | 8/2016 | Nejatali | |
| 2016/0261142 A1* | 9/2016 | Park | H02J 50/40 |
| 2016/0285279 A1 | 9/2016 | Mehas | |
| 2016/0336759 A1 | 11/2016 | Yamamoto | |
| 2016/0336760 A1 | 11/2016 | Yamamoto | |
| 2016/0359372 A1* | 12/2016 | Lee | H02J 7/025 |
| 2017/0093217 A1* | 3/2017 | Cho | H02J 7/025 |
| 2017/0117755 A1* | 4/2017 | Muratov | H02J 50/60 |
| 2017/0126064 A1* | 5/2017 | Lee | H02J 50/12 |
| 2017/0127224 A1* | 5/2017 | Nakano | H04B 5/0031 |
| 2017/0141615 A1* | 5/2017 | Moon | H02J 50/12 |
| 2017/0163099 A1* | 6/2017 | Kanno | H02J 50/12 |
| 2017/0264102 A1* | 9/2017 | Maekawa | B60L 11/182 |
| 2017/0279308 A1* | 9/2017 | Jung | H02J 50/12 |
| 2017/0294799 A1* | 10/2017 | Lee | H02J 7/025 |
| 2017/0299754 A1* | 10/2017 | MacK | H02J 50/60 |
| 2017/0317721 A1* | 11/2017 | Kozaki | A01K 29/00 |
| 2018/0145541 A1* | 5/2018 | Taya | H02J 50/12 |
| 2018/0159377 A1* | 6/2018 | Jung | H01F 38/14 |

FOREIGN PATENT DOCUMENTS

WO 2013/136464 9/2013
WO 2013/179394 12/2013

OTHER PUBLICATIONS

Extended European Search Report dated Nov. 4, 2015 for European Patent Application No. 15165892.9.

* cited by examiner

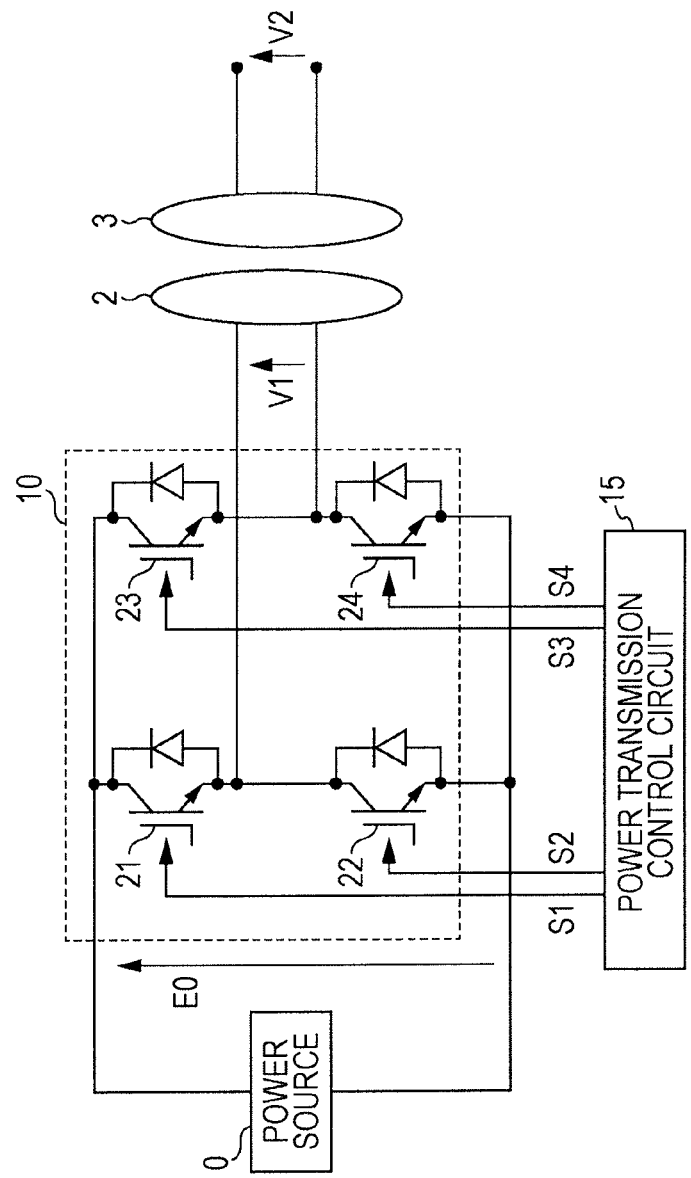

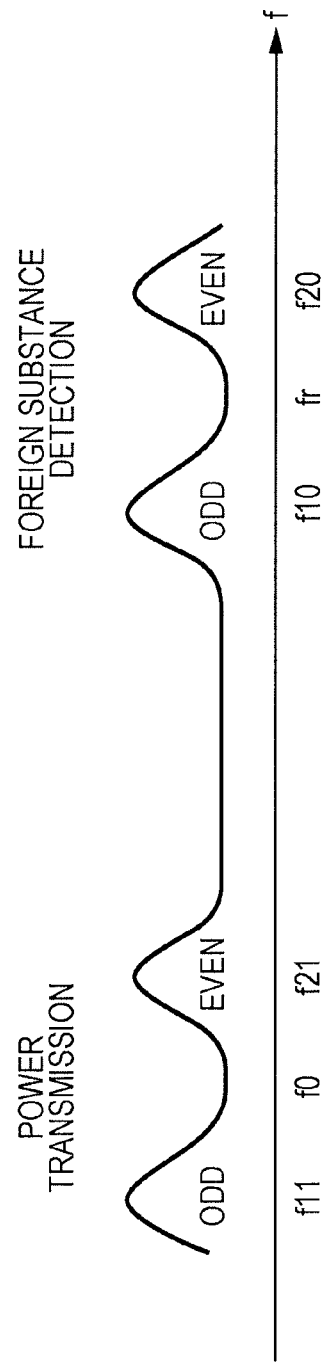

WIRELESS POWER TRANSMISSION SYSTEM AND POWER TRANSMISSION DEVICE OF WIRELESS POWER TRANSMISSION SYSTEM

CROSS-REFERENCE TO RELATED APPLICATIONS

This is a continuation application of pending U.S. patent application Ser. No. 14/712,775, filed on May 14, 2015 which claims priority to JAPAN Application No. 2014-108817, filed May 27, 2014. The disclosures of these documents, including the specifications, drawings and claims, are incorporated herein by reference in their entirety.

BACKGROUND

1. Technical Field

The present disclosure relates to a wireless power transmission system provided with a function of detecting a foreign object between coils, and a power transmission device of the wireless power transmission system.

2. Description of the Related Art

In recent years, electronic devices and EV devices that involve mobility such as that afforded by a portable telephone or an electric automobile have become widespread. The development of wireless power transmission systems targeting such devices has been advancing. Methods such as the electromagnetic induction method, the magnetic field resonance method (resonance magnetic field coupling method), and the electric field coupling method are known as examples of wireless power transmission technologies.

A wireless power transmission system according to the electromagnetic induction method and the magnetic field resonance method is provided with a power transmission device equipped with a power transmission coil and a power reception device equipped with a power reception coil. Power can be transmitted without electrodes being brought into direct contact, as a result of the power reception coil supplementing the magnetic field produced by the power transmission coil. A wireless power transmission system such as this is disclosed in Japanese Unexamined Patent Application Publication No. 2009-11129 and Japanese Unexamined Patent Application Publication No. 2012-016171, for example.

SUMMARY

However, a power transmission device of a wireless power transmission system that transmits power continuously with high efficiency is required in the related prior art.

According to a power transmission device of one aspect of the present disclosure, the power transmission device transmits first AC power in a noncontact manner to a power receiving device having a first resonator, the first resonator receiving the first AC power.

The power transmission device comprising:
a second resonator that electromagnetically couples with the first resonator to transmit the first AC power to the first resonator;
a third resonator that electromagnetically couples with the first resonator to transmit a second AC power to the first resonator;
an inverter that generates the first AC power by using either a frequency f11 or a frequency f12, the frequency f11 being lower than a first resonance frequency f0 between the first resonator and the second resonator, the frequency f12 being higher than the first resonance frequency f0;
an oscillator that generates the second AC power by using either a frequency f10 or a frequency f20, the frequency f10 being lower than a second resonance frequency fr between the first resonator and the third resonator, the frequency f20 being higher than the second resonance frequency fr;
a foreign substance (object) detector that determines whether or not a foreign object is present between the first resonator and the third resonator based on a physical quantity in the third resonator that changes according to the second AC power of either the frequency f10 or the frequency f20; and
power transmission control circuitry operative to:
set a foreign substance (object) detection period in which foreign object is detected by the foreign substance detector, between i) a first power transmission period in which the first AC power is transmitted from the second resonator to the first resonator and ii) a second power transmission period subsequent to the first power transmission period;
set to the inverter, one of the frequency f11 or the frequency f12 in the first power transmission period; and
set to the inverter, the other of the frequency f11 or the frequency f12 in the second power transmission period if it is determined that the foreign object is present in the foreign object detection period.

It should be noted that these comprehensive or specific aspects may be realized by using a system, a method, an integrated circuit, a computer program, or a recording medium. Alternatively, these comprehensive or specific aspects may be realized by using an arbitrary combination of a system, a device, a method, an integrated circuit, a computer program, and a recording medium.

According to one aspect of the present disclosure, a power transmission device that can transmit power continuously with high efficiency can be provided.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a drawing depicting a configuration of an inverter according to the first embodiment of the present disclosure;

FIG. 6 is a drawing for describing foreign substance detection frequencies and power transmission frequencies in the device according to the first embodiment of the present disclosure;

Figure 1:
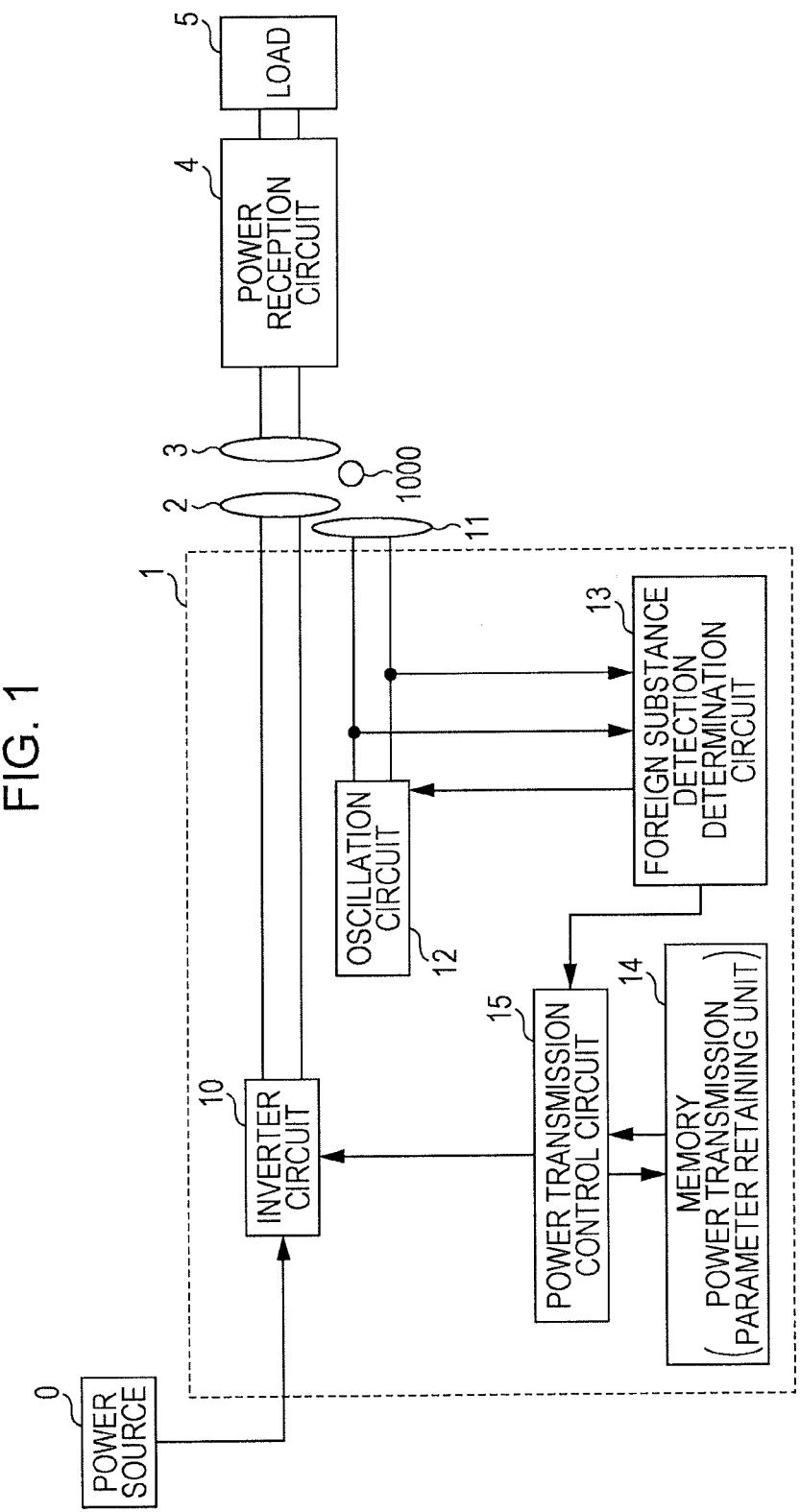
FIG. 1 is a configuration diagram of a wireless power transmission system according to a first embodiment of the present disclosure.

DETAILED DESCRIPTION (Findings Forming the Basis of the Present Disclosure)

The present inventors found that the following problem occurs with regard to the wireless power transmission system described in the "Description of the Related Art" section.

First, the definition of a "foreign object" is explained. In the present disclosure, a "foreign object" represents an object such as a metal or a human body (animal) that generates heat due to power transmitted between a power transmission coil and a power reception coil of a wireless power transmission system, when positioned near the power transmission coil or the power reception coil.

An operation of a power transmission device of a wireless power transmission system is described next. First, when a power source switch of the power transmission device is turned on, the power transmission device carries out positional alignment between the power transmission device and the power reception device. When the positional alignment between the power transmission device and the power reception device has been completed, foreign object detection is carried out in which it is determined whether or not a foreign object is present between the power transmission device and the power reception device. If it is determined that a foreign object is not present between the power transmission device and the power reception device, AC power is transmitted in a non-contact manner from the power transmission device to the power reception device.

In an in-vehicle power transmission device mounted in an armrest section or the like, there are cases where a foreign object intrudes between the power transmission device and the power reception device during power transmission while the vehicle is being driven. In such cases, there is concern of excess current being generated in the foreign object and the foreign object overheating.

In order to prevent the foreign object from overheating, it is conceivable for, once power transmission has been started, a foreign object detection period in which foreign object detection is carried out and a power transmission period in which power transmission is carried out to be repeated, and for monitoring to be carried out such that the foreign object does not overheat.

The stopping of power transmission if the power transmission device detects a foreign object is disclosed in Japanese Unexamined Patent Application Publication No. 2009-11129. In Japanese Unexamined Patent Application Publication No. 2009-11129, the generation of heat by a foreign object can be suppressed by stopping power transmission. However, because power transmission cannot be restarted unless the user removes the foreign object, before long the battery of the power reception device is consumed and the power reception device stops. In terms of safety, it is difficult for the user to remove the foreign object while driving a vehicle. Thus, it is desirable that power transmission be able to be continued even if a foreign object intrudes between the power transmission device and the power reception device and the foreign object is detected during power transmission while the vehicle is being driven.

The following is disclosed in paragraph 0080 of Japanese Unexamined Patent Application Publication No. 2012-016171 as a method for continuing power transmission even if a foreign object is detected. First, a plurality of power transmission coils that are arranged in a row and a plurality of power reception coils that oppose in such a way as to form pairs with the plurality of power transmission coils are used to identify a first power transmission coil in which a foreign object is detected and a second power transmission coil in which a foreign object is not detected. The second power transmission coil in which a foreign object is not detected is then used to transmit power to a power reception coil. It is disclosed that power is transmitted by controlling magnetic flux by not using the first power transmission coil in which a foreign object is detected, such that power is not erroneously transmitted to the foreign object. Power consumption can thereby be continuously carried out even if a foreign object is detected.

However, as a result of investigating the method of Japanese Unexamined Patent Application Publication No. 2012-016171 in detail, the present inventors found that this method has the following problem.

In the method of Japanese Unexamined Patent Application Publication No. 2012-016171, in order to identify a second power transmission coil in which a foreign object is not detected from among the plurality of power transmission coils, the frequencies of the power transmission coils or the frequencies of the power reception coils that have formed the plurality of pairs are measured, and a second power transmission coil in which a foreign object is not detected is identified based on a deviation in both measured frequencies. Thus, a plurality of power reception coils that oppose the plurality of power transmission coils are required in the same quantity as the plurality of power transmission coils.

For example, if one power reception device such as a smartphone only has one power reception coil, in the method of Japanese Unexamined Patent Application Publication No. 2012-016171, one power transmission coil from among a plurality of power transmission coils becomes the power transmission coil that corresponds to the one power reception coil and forms a pair.

In a state in which the one power reception coil and the one power transmission coil form a pair, even if a foreign object is detected between the one pair of the power reception coil and the power transmission coil, the user is not able to move the power reception device to search for a second power transmission coil in which the foreign object is not detected, while driving a vehicle, in order to prevent the foreign object from overheating. Consequently, it was found that the method of Japanese Unexamined Patent Application Publication No. 2012-016171 has a problem in that power transmission cannot be continued in the case where one power reception device such as a smartphone only has one power reception coil.

Furthermore, in Japanese Unexamined Patent Application Publication No. 2012-016171, there is a problem in that the area of an installation base of the power transmission device becomes larger because a plurality of power transmission coils are used. Furthermore, there is a problem in that the number of components increases and the cost increases because a plurality of power transmission coils and a plurality of power reception coils are used.

Consequently, for example, a power transmission device that can continue transmitting power even with one power reception device having one power reception coil such as a smartphone, and that has an installation base having a small area is desired. Furthermore, a power transmission device that transmits power continuously with high efficiency while preventing a foreign object from overheating is desired.

In consideration of the above, the present inventors arrived at the aspects disclosed hereinafter.

According to a power transmission device of one aspect of the present disclosure, the power transmission device transmits first AC power in a noncontact manner to a power receiving device having a first resonator, the first resonator receiving the first AC power.

The power transmission device comprising:
a second resonator that electromagnetically couples with the first resonator to transmit the first AC power to the first resonator;
a third resonator that electromagnetically couples with the first resonator to transmit a second AC power to the first resonator;
an inverter that generates the first AC power by using either a frequency $f11$ or a frequency $f12$, the frequency $f11$ being lower than a first resonance frequency $f0$ between the first resonator and the second resonator, the frequency $f12$ being higher than the first resonance frequency $f0$;
an oscillator that generates the second AC power by using either a frequency $f10$ or a frequency $f20$, the frequency $f10$ being lower than a second resonance frequency $fr$ between the first resonator and the third resonator, the frequency $f20$ being higher than the second resonance frequency $fr$;
a foreign object detector that determines whether or not a foreign object is present between the first resonator and the third resonator based on a physical quantity in the third resonator that changes according to the second AC power of either the frequency $f10$ or the frequency $f20$; and
power transmission control circuitry operative to:
set a foreign object detection period in which foreign object is detected by the foreign object detector, between i) a first power transmission period in which the first AC power is transmitted from the second resonator to the first resonator and ii) a second power transmission period subsequent to the first power transmission period;
set to the inverter, one of the frequency $f11$ or the frequency $f12$ in the first power transmission period; and
set to the inverter, the other of the frequency $f11$ or the frequency $f12$ in the second power transmission period if it is determined that the foreign object is present in the foreign object detection period.

Figure 5A:
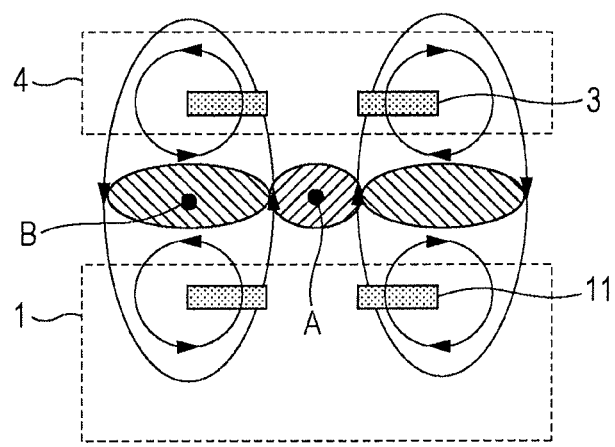
FIG. 5A is a schematic diagram depicting the flow of magnetic flux in a low-frequency magnetic field mode (odd mode) of a device according to the first embodiment of the present disclosure.

According to the aforementioned aspect, either one of the frequency $f11$ and the frequency $f12$ is used in the first power transmission period. If power is being transmitted at the frequency $f11$ in the first power transmission period, the magnetic field of a central section A between the coil of the first resonator and the coil of the second resonator becomes dense and the magnetic field of a peripheral section B becomes sparse, as depicted in FIG. 5A. Thus, power is being transmitted in a state in which the magnetic field of the central section A is dense and the magnetic field of the peripheral section B is sparse. To rephrase, power is being transmitted for the most part by the magnetic field of the central section A. Either one of the frequency $f10$ and the frequency $f20$ is used in the foreign object detection period. If oscillation is being performed at the frequency $f10$ in the foreign object detection period, the magnetic field of the central section A between the coil of the second resonator and the coil of the third resonator becomes dense and the magnetic field of the peripheral section B becomes sparse, as depicted in FIG. 5A.

Thus, if it is determined that a foreign object is present when oscillation is being performed at the frequency $f10$, it is understood that the foreign object is present in the central section A. Thus, in the second power transmission period, by transmitting power at the frequency $f12$, which has a magnetic field distribution in which the magnetic field of the central section A is sparse and the magnetic field of the peripheral section B is dense, power can be transmitted with high efficiency while the generation of heat by the foreign object is suppressed.

Figure 5B:
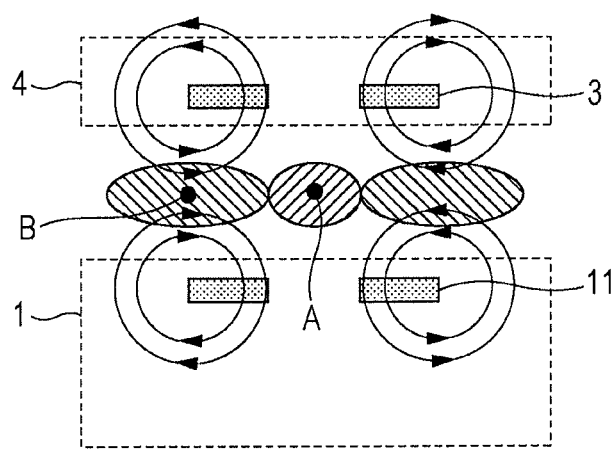
FIG. 5B is a schematic diagram depicting the flow of magnetic flux in a high-frequency magnetic field mode (even mode) of the device according to the first embodiment of the present disclosure.

On the other hand, if power is being transmitted at the frequency $f12$ in the first power transmission period, the magnetic field of the central section A between the coil of the first resonator and the coil of the second resonator becomes sparse and the magnetic field of the peripheral section B becomes dense, as depicted in FIG. 5B. Thus, power is being transmitted in a state in which the magnetic field of the central section A is sparse and the magnetic field of the peripheral section B is dense. To rephrase, power is being transmitted for the most part by the magnetic field of the peripheral section B.

Thus, if it is determined that a foreign object is present when oscillation is being performed at the frequency $f20$, it is understood that the foreign object is present in the peripheral section B. Thus, in the second power transmission period, by transmitting power at the frequency $f11$, which has a magnetic field distribution in which the magnetic field of the central section A is dense and the magnetic field of the peripheral section B is sparse, power can be transmitted with high efficiency while the generation of heat by the foreign object is suppressed.

To summarize the above, if it is determined that a foreign object is present in the foreign object detection period, the inverter is instructed to use, in the second power transmission period, the frequency f11 or the frequency f12 that is a different frequency from the frequency used in the first power transmission period. By then causing the transmission of the first AC power to be started, power can be transmitted continuously with high efficiency while the foreign object is prevented from overheating.

Furthermore, because the power transmission device can be realized with only one power transmission coil, power can be transmitted even with a power reception device having one power reception coil such as a smartphone, and a power transmission device that has an installation base having a small area can be realized.

An overview of the embodiments of the present disclosure is as follows.

Hereinafter, exemplary embodiments of the present disclosure is described with reference to the drawings. It should be noted that the present disclosure is not limited to the following embodiments. A new embodiment may be configured by implementing various modifications to the embodiments and by combining a plurality of embodiments. In the following description, constituent elements that are the same or similar are denoted by the same reference numerals.

Embodiment 1

FIG. 1 is a drawing depicting an overview of a configuration of a wireless power transmission system in embodiment 1 of the present disclosure. This wireless power transmission system is provided with a power transmission circuit 1, a power reception circuit 4, a load 5, a second resonator 2, a first resonator 3, and a third resonator 11. The power transmission circuit 1, the second resonator 2, and the third resonator 11 can be mounted in a power transmission device. The first resonator 3, the power reception circuit 4, and the load 5 can be mounted in a power reception device. The power reception device can be an electronic device such as a smartphone, a tablet terminal, and a mobile terminal, or an electrically powered machine such as an electric automobile, for example. The power transmission device can be a charger that supplies power wirelessly to the power reception device. The load 5 can be a device provided with a secondary battery, for example. The load 5 may be an element that is external to the wireless power transmission system. A power source 0 that supplies DC energy (hereinafter, energy may be rephrased as power) to the power transmission circuit 1 is also drawn in FIG. 1. The power source 0 may be included in the present system or may be an element that is external to the present system.

Each of the second resonator 2, the first resonator 3, and the third resonator 11 are resonance circuits that include a coil and a capacitor. In the present system, non-contact power transmission is carried out between the second resonator 2 and the first resonator 3. Furthermore, electromagnetic coupling between the third resonator 11 and the first resonator 3 can be used to detect a foreign object. In the following description, a mode in which power transmission is carried out is referred to as a "power transmission mode" and a mode in which a foreign object is detected is referred to as a "foreign object detection mode". Here, a "foreign object" refers to an object that generates heat when having approached the second resonator 2 or the first resonator 3. A metal and a living body such as a human body or an animal are examples of a foreign object.

The power transmission circuit 1 is provided with an inverter 10 (also referred to as a "inverter circuit"), a power transmission control circuitry 15 (also referred to as a "power transmission control circuit"), a memory 14, an oscillator 12 (also referred to as a "oscillation circuit"), and a foreign object detector 13 (also referred to as a "foreign substance detection determination circuit"). The memory 14 stores a control parameter (also referred to as a "power transmission parameter") that is set when power is transmitted. The memory 14 is therefore sometimes referred to as a "power transmission parameter retaining unit". The power transmission parameter is a parameter relating to power transmission control such as a frequency. The details of the power transmission parameter are described hereinafter. In the power transmission mode, power is transmitted wirelessly to the power reception device by the power transmission control circuitry 15, the inverter 10, and the second resonator 2. In the foreign object detection mode, a foreign object that is near the third resonator 11 or the first resonator 3 is detected by the oscillator 12 and the foreign object detector 13.

Figure 2:
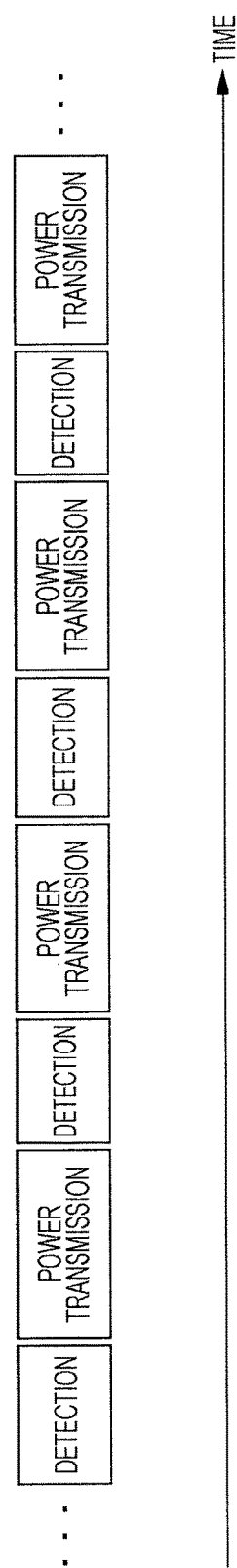
FIG. 2 is a drawing depicting an overview of an operation of the wireless power transmission system according to the first embodiment of the present disclosure.

FIG. 2 is a drawing depicting the flow of processing carried out by the power transmission circuit 1. The power transmission circuit 1 executes the power transmission mode and the foreign object detection mode while switching between modes at each prescribed time. The duration for which the power transmission mode is carried out one time can be set to the order of several seconds to several tens of seconds, for example. The duration for which the foreign object detection mode is carried out one time can be set to the order of several milliseconds to several seconds, for example. However, the present disclosure is not limited to examples such as these.

The inverter 10 is connected to the power source 0 and the second resonator 2. The inverter 10 converts DC energy (power) that is input from the power source 0 into AC energy(power) and supplies the AC energy to the second resonator 2. The power transmission control circuitry 15 controls the switching of a plurality of switching elements that are included in the inverter 10, and, specifically, carries out control with which the conduction state of each of the plurality of switching elements is switched at a prescribed frequency. The power transmission control circuitry 15 thereby causes AC energy to be output from the inverter 10. When power transmission is started, the power transmission control circuitry 15 reads out a control parameter stored in the memory 14 and controls the inverter 10 on the basis thereof.

During power transmission, the power transmission control circuitry 15 changes the control parameter in accordance with the state of the load 5. When transitioning from the power transmission mode to the foreign object detection mode, the power transmission control circuitry 15 records the control parameter of that time in the memory 14. Power transmission can thereby be restarted based on the immediately preceding control parameter when the power transmission mode is next started.

The second resonator 2 and the first resonator 3 are configured to resonate at a frequency f0. To rephrase, the inductance of each coil and the capacitance of each capacitor are set such that the second resonator 2 and the first resonator 3 have a resonance frequency f0. A coil included in the second resonator 2 sends AC energy supplied from the power transmission circuit 1 out into a space. The first resonator 3 receives at least some of the AC energy sent out from the second resonator 2. The AC energy received by the first resonator 3 is sent to the power reception circuit 4. The power reception circuit 4 rectifies the received AC energy and supplies the rectified AC energy to the load 5.

In the foreign object detection mode, the power transmission circuit 1 drives the oscillator 12 and the foreign object detector 13. The oscillator 12 is configured such that a voltage including an AC component is output to the third resonator 11. A "voltage including an AC component" means a voltage including a component that periodically fluctuates. A voltage including an AC component is not limited to a voltage that changes sinusoidally and may be a voltage having an arbitrary waveform that periodically changes such as a triangle wave or a square wave.

The third resonator 11 and the first resonator 3 are configured to resonate at a frequency fr. To rephrase, the inductance of each coil and the capacitance of each capacitor are set such that the third resonator 11 and the first resonator 3 have a resonance frequency fr. When a voltage is supplied from the oscillator 12, the third resonator 11 forms a magnetic field at the periphery thereof and electromagnetically couples with the first resonator 3.

The foreign object detector 13 is connected to the oscillator 12 and the power transmission control circuitry 15. The foreign object detector 13 can detect a foreign object 1000 positioned near the third resonator 11 or the first resonator 3. If the foreign object 1000, such as a metal, approaches the third resonator 11 or the first resonator 3, the waveform of the voltage that is output from the oscillator 12 fluctuates. The foreign object detector 13 determines whether or not a foreign object is present on the basis of that fluctuation. The detection of a foreign object is not limited to the fluctuation of a voltage, and can also be carried out based on the fluctuation of another physical quantity that changes according to a voltage. In the present specification, a "physical quantity that changes according to a voltage" includes a physical quantity other than a voltage itself such as an input impedance or an input inductance of the third resonator 11, a Q factor, or a coupling coefficient, for example. Based on the result of the foreign object detection, the foreign object detector 13 decides a control parameter to be used for the next power transmission and instructs the power transmission control circuitry 15. The power transmission subsequent to the foreign object detection can thereby be carried out with high efficiency.

Next, a more detailed configuration and operation of each constituent element is described.

FIG. 3 is a drawing depicting a detailed configuration example of the inverter 10. The inverter 10 in this example has the configuration of a full-bridge inverter. This inverter 10 has four switching elements 21, 22, 23, and 24. The switching elements 21 to 24 being on (conduction) or off (non-conduction) is respectively controlled by control signals S1 to S4 that are input from the power transmission control circuitry 15. The second resonator 2 and the first resonator 3 have the resonance frequency f0. Consequently, the on/off switching frequency of each switching element, namely the power transmission frequency, is set to a value in the vicinity of f0. If the on/off switching frequency of each switching element is changed, the input impedance of the second resonator 2 changes. As a result, the magnitudes of an input voltage V1 of the second resonator 2 and an output voltage V2 of the first resonator 3 change.

Figure 4A:
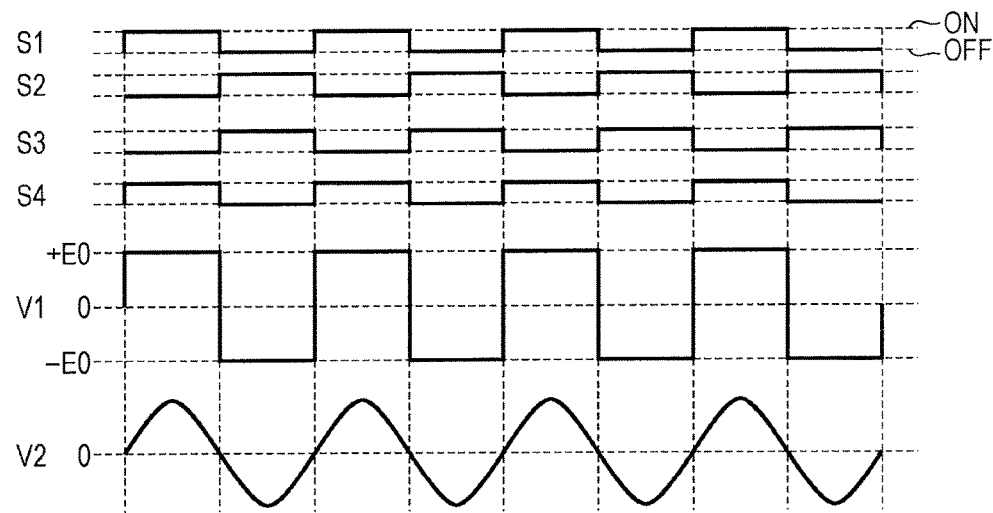
FIG. 4A is a drawing for describing an operation of the inverter according to the first embodiment of the present disclosure.

FIG. 4A is a drawing depicting an example of changes over time in the control signals S1 to S4 output from the power transmission control circuitry 15, the output voltage V1 of the inverter 10, and the voltage V2 output from the first resonator 3. In this example, the phases of the control signals S1 and S4, with which the on/off timings of the switching elements 21 and 24 are decided, coincide. Similarly, the phases of the control signals S2 and S3, with which the on/off timings of the switching elements 22 and 23 are decided, coincide. The timing at which the switching elements 21 and 24 turns on and the timing at which the switching elements 21 and 24 turns off deviate by a half period. As a result, the voltage V1 output from the inverter 10 has a waveform in which a period having a positive value E0 and a period having a negative value −E0 are repeated in an alternating manner. The voltage V2 output from the first resonator 3 has a sinusoidal waveform in which the voltage V1 is smoothed.

Figure 4B:
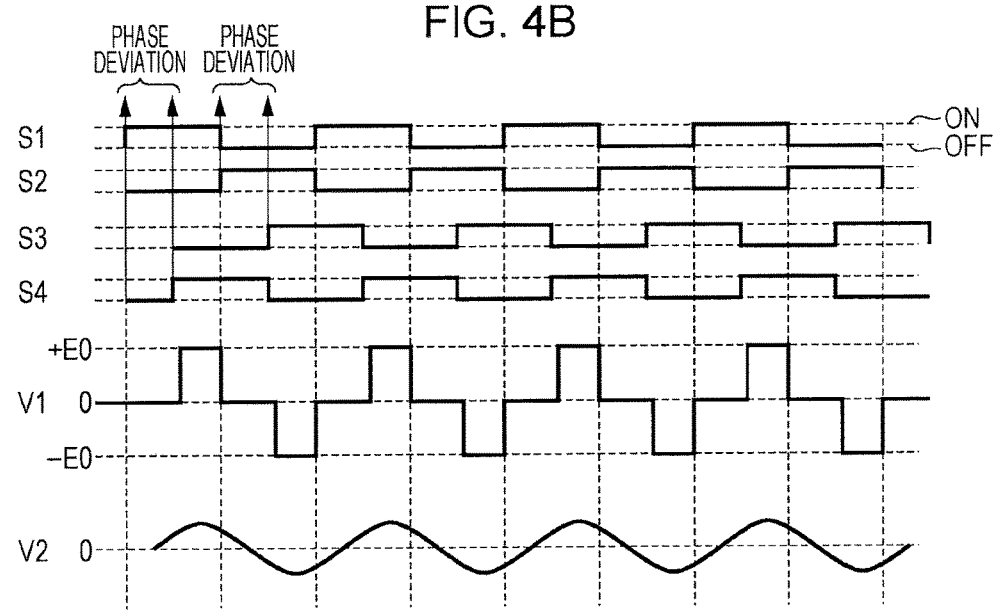
FIG. 4B is a drawing for describing an operation of the inverter according to the first embodiment of the present disclosure.

FIG. 4B is a drawing depicting another example of changes over time in the control signals S1 to S4, the voltage V1, and the voltage V2. In this example, a phase deviation occurs between the control signal S1 and the control signal S4, and between the control signal S2 and the control signal S3. Therefore, the output time ratio of the inverter 10 is less than the output time ratio in the example of FIG. 4A. Here, an "output time ratio" means, within one period, the proportion of time during which a voltage having an absolute value that is greater than a prescribed value (the order of several percent to 20% of the absolute value of an amplitude, for example) is output. The voltage applied to the load 5 increases as the output time ratio increases. In this example, the output time ratio is controlled by adjusting the phase of the control signal that is input to each switching element. The duty cycle of the output voltage V1 changes as a result of the phases of two control signals input to two switching elements that turn on at the same time being shifted. As a result, the magnitude of the output voltage V2 of the first resonator 3 also changes.

The impedance of the load 5 sometimes changes during power transmission. In such case, the voltage applied to the load 5 changes. If it is necessary for the load 5 to be driven by a fixed voltage, it is necessary for control to be performed such that a fixed voltage is applied to the load 5 even when the impedance of the load 5 changes. Therefore, the power transmission control circuitry 15 performs control such that the voltage applied to the load 5 becomes fixed, by adjusting the switching timing phase of each switching element. If the impedance of the load 5 has changed, the frequency that provides the optimum transmission efficiency also changes. Therefore, the power transmission control circuitry 15 also causes the on/off switching frequency of each switching element to change according to the impedance of the load 5. In other words, the power transmission control circuitry 15 controls the magnitude of the output voltage of the first resonator 3 with the on/off switching frequency of each switching element and the phases of the control signals serving as control parameters.

A change in the impedance of the load 5 can be transmitted to the power transmission circuit 1 from the power reception circuit 4 by way of an undepicted communication circuit, for example. As a method for transmitting information from the power reception circuit 4 to the power transmission circuit 1, there is a method in which a switch that causes load impedance to fluctuate is provided at an output terminal of the power reception circuit 4, and that switch is turned on/off at a frequency that is sufficiently different from the frequency of the power transmission circuit 1, for example. By turning the switch on/off, the change in load impedance detected by the power reception circuit 4 can be frequency-modulated and transmitted to the power transmission circuit 1 as information. The power transmission circuit 1 detects fluctuations in the voltages of both terminals of the second resonator 2 produced by the switch being turned on/off and fluctuations in the amount of current generated in the input terminal of the inverter 10, and demodulates the detection result to thereby be able to read the transmitted information. Information may be transmitted by another communication method such as near field communication (NFC) or a wireless LAN without being limited to a method such as the aforementioned.

The adjustment of the output time ratio is not limited to the amount of phase deviation among control signals and may be carried out by changing the duty ratio of each control signal. For example, the duty ratio of the output voltage V1 can be made smaller by making the duty ratio of each control signal smaller. Consequently, the power transmission control circuitry 15 may be configured to adjust the duty ratio of each control signal instead of the phase.

The inverter 10 is a full-bridge inverter in the example depicted in FIG. 3; however, the present disclosure is not limited to this example. For instance, the inverter 10 may be a half-bridge inverter having two switching elements and two capacitors, or may be an E-class amplifier having one switching element, two inductors, and two capacitors. With either configuration it is possible to control the magnitude of the output the first resonator 3 with the power transmission frequency and switching timing phases and the like serving as control parameters.

A DC/DC converter may be provided between the power source 0 and the inverter 10. In a configuration such as this, the output voltage of the inverter 10 can be controlled by causing a DC voltage that is input to the inverter 10 to change by means of the DC/DC converter. If a DC/DC converter is provided, it is not necessary for the duty cycle or phase of the control signals input to each switching element of the inverter 10 to be adjusted. In this case, the duty cycle or switching frequency of the switching elements with which the output voltage of the DC/DC converter is decided can be set as a control parameter.

The power transmission parameter retaining unit 14 is a memory that stores various control parameters required for power transmission. The power transmission parameter retaining unit 14 stores the value of a control parameter that is used when initial power transmission is started, as a "global initial value". The power transmission parameter retaining unit 14 also stores the value of a control parameter required when power transmission is next restarted after having been temporarily stopped, as a "local initial value".

The power transmission control circuitry 15 controls the operation of the inverter 10 in the power transmission mode. The power transmission control circuitry 15 can be realized by combining a gate driver and a processor, for example. In the foreign object detection mode, the power transmission control circuitry 15 stops the output of the inverter 10 such that the second resonator 2 does not generate an electromagnetic field. Thus, the effect of a magnetic field caused by transmitted power is eliminated to improve the sensitivity of the foreign object detection. When transitioning from the power transmission mode to the foreign object detection mode, the power transmission control circuitry 15 updates the local initial value recorded in the power transmission parameter retaining unit 14, with the value of the control parameter from immediately before the output of the inverter 10 was stopped. The updated local initial value is set once again when the power transmission mode is next restarted after the foreign object detection processing.

If the foreign object 1000, such as a metal, is present near the second resonator 2 and the first resonator 3 during power transmission, there is a possibility of an excess current being generated in the foreign object 1000 by the magnetic field produced from the second resonator 2. In such case, the foreign object 1000 generates heat if the power transmission is continued in that state. Therefore, the wireless power transmission system of the present embodiment uses the oscillator 12, the foreign object detector 13, and the third resonator 11 to detect the foreign object 1000.

A self-exciting oscillator based on the LC resonance principle, such as a Colpitts oscillator, a Hartley oscillator, a Clapp oscillator, a Franklin oscillator, or a Pearce oscillator, for example, can be used for the oscillator 12. The present disclosure is not limited to the aforementioned and another oscillator may be used.

The foreign object detector 13 is a processor that carries out control for the oscillator 12 and foreign object detection processing. The foreign object detector 13 can be realized by combining a CPU and a memory in which a computer program is stored, for example. The foreign object detector 13 may be dedicated hardware configured to realize the operation described hereinafter.

The first resonator 3 in the present embodiment is configured from a parallel resonance circuit that includes a coil and a capacitor. The third resonator 11 is configured to be able to electromagnetically couple with the first resonator 3. The first resonator 3 and the third resonator 11 both have the resonance frequency fr. The foreign object detector 13 determines foreign object whether or not a foreign object is present on the basis of a physical quantity such as the voltages of both terminals of the third resonator 11 in a state in which the oscillator 12 is oscillating.

Next, this foreign object detection process is described in detail. One principle of the foreign object detection of the present embodiment is that foreign object whether or not a foreign object is present is determined by measuring change in a physical quantity such as a voltage that occurs due to the foreign object 1000, such as a metal, interrupting a magnetic field.

FIG. 5A and FIG. 5B are schematic diagrams depicting the flow of magnetic flux in two magnetic field modes for when the first resonator 3 and the third resonator 11 are coupled. These diagrams depict cross sections of when both the coil of the first resonator 3 and the coil of the third resonator 11 have been cut at a plane perpendicular to the coil surface, in the case where the coils are placed in a parallel manner with the central axes being aligned. FIG. 5A depicts a magnetic field mode for when the first resonator 3 and the third resonator 11 are electromagnetically coupled at a frequency f10 that is lower than the resonance frequency fr. A magnetic field mode such as this is referred to as an odd mode. FIG. 5B depicts a magnetic field mode for when the first resonator 3 and the third resonator 11 are electromagnetically coupled at a frequency f20 that is higher than the resonance frequency fr. A magnetic field mode such as this is referred to as an even mode.

As depicted in FIG. 5A, when the first resonator 3 and the third resonator 11 are electromagnetically coupled at the frequency f10, which is lower than the resonance frequency fr, the magnetic field between the two resonators is concentrated in a central section A. In other words, the directions of magnetic flux are uniform and the magnetic flux is mutually strengthened in the central section A between the two coils. The magnetic flux in the central section A therefore becomes dense. Conversely, the directions of magnetic flux are opposed and the magnetic flux is mutually canceled in a peripheral section B between portions from the internal diameter to the external diameter of the two coils. The magnetic flux in the peripheral section B therefore becomes sparse. On the other hand, as depicted in FIG. 5B, when the first resonator 3 and the third resonator 11 are electromagnetically coupled at the frequency f20, which is higher than the resonance frequency fr, the magnetic field between the two resonators is concentrated in the peripheral section B. In other words, magnetic flux becomes sparse in the central section A between the coils and magnetic flux becomes dense in the peripheral section B from the internal diameter to the external diameter of the two coils.

When a foreign object is present between the first resonator 3 and the third resonator 11, it is thought that the change in the voltages of both terminals of the third resonator 11 increases as the magnetic flux in that location becomes denser. Consequently, it is thought that the detection precision for a foreign object present in the central section A is improved when the oscillation frequency is f10. Conversely, it is thought that the detection precision for a foreign object present in the peripheral section B is improved when the oscillation frequency is f20.

The aforementioned is also true when the second resonator 2 and the first resonator 3 are electromagnetically coupled. In other words, when the second resonator 2 and the first resonator 3 are electromagnetically coupled at the frequency f11, which is lower than the resonance frequency f0, the magnetic field between the two resonators is concentrated in the central section A. Therefore, magnetic flux in the central section A becomes dense and magnetic flux in the peripheral section B becomes sparse. On the other hand, when the second resonator 2 and the first resonator 3 are electromagnetically coupled at a frequency f21, which is higher than the resonance frequency fr, the magnetic field between the two resonators is concentrated in the peripheral section B. Therefore, magnetic flux in the peripheral section B becomes dense and magnetic flux in the central section A becomes sparse.

If a foreign object becomes included between the second resonator 2 and the first resonator 3 during power transmission, the heat generated by the foreign object decreases where there is less magnetic flux that is interrupted. Therefore, if there is a foreign object in the vicinity of the central section of the coil of the second resonator 2, it is thought that the generated heat can be reduced to a greater extent when oscillation is performed at the frequency f21 than when oscillation is performed at the frequency f11. On the other hand, if there is a foreign object in the vicinity of the peripheral section of the coil of the second resonator 2, it is thought that the generated heat can be reduced to a greater extent when oscillation is performed at the frequency f11 than when oscillation is performed at the frequency f21.

Therefore, in the foreign object detection mode, the foreign object detector 13 in the present embodiment determines whether a foreign object is present near to either the central section A or the peripheral section B. In the power transmission mode carried out thereafter, the power transmission control circuitry 15 is instructed such that power is transmitted at a frequency with which the magnetic flux of the position at which it is thought that a foreign object is present decreases. More specifically, the foreign object detector 13 determines whether or not a voltage fluctuation that occurs when oscillation is performed at the frequency f10 is greater than a voltage fluctuation that occurs when oscillation is performed at the frequency f20. If the former is greater than the latter and that fluctuation exceeds a prescribed threshold value, the foreign object detector 13 instructs the power transmission control circuitry 15 such that power is transmitted at the frequency f21. Conversely, if the latter is greater than the former and that fluctuation exceeds the prescribed threshold value, the foreign object detector 13 instructs the power transmission control circuitry 15 such that power is transmitted at the frequency f11. With control such as this, a decline in power transmission efficiency due to a foreign object can be suppressed.

FIG. 6 is a drawing schematically depicting the relationship between frequencies f10, fr, and f20 used for foreign object detection and frequencies f11, f0, and f21 used for power transmission. When the two resonators are electromagnetically coupled, the resonance frequency separates into two frequencies. The four peaks in FIG. 6 represent the coupling between the resonators becoming stronger at the two separated pairs of resonance frequencies during foreign object detection and during power transmission. If the frequencies f10, f20, f11, and f21 are set to values in the vicinity of these separated resonance frequencies, an operation can be carried out with high efficiency. As mentioned above, the relationships of f10<fr<f20 and f11<f0<f21 are established among f10, fr, f20, f11, f0, and f21. The frequency f0 can be set to a value within the range of 100 kHz to 200 kHz, for example. The frequency fr can be set to a value within the range of 500 kHz to 1.5 MHz, for example. The frequencies f0 and fr may be set to values outside of these ranges. In the present embodiment, the frequency fr is higher than the frequency f0. However, the frequencies f0 and fr may be equal or the frequency f0 may be higher than the frequency fr.

Figure 7:
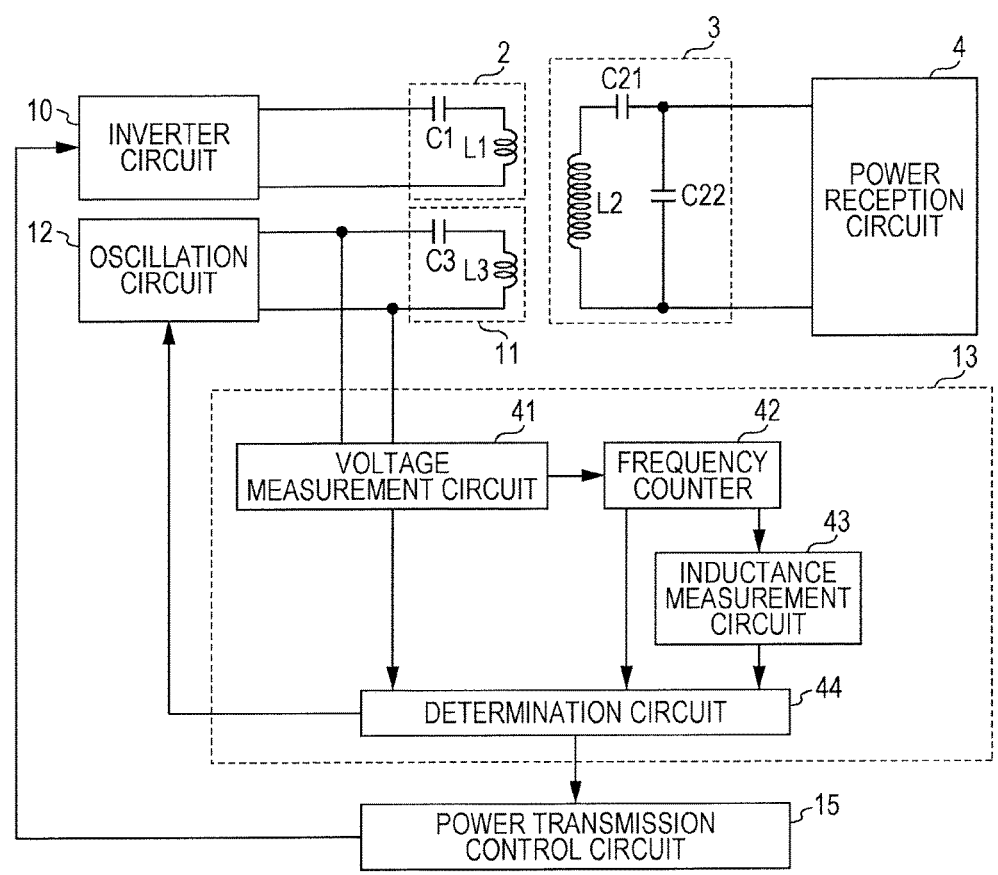
FIG. 7 is a configuration diagram depicting a foreign substance detector according to the first embodiment of the present disclosure.

FIG. 7 is a drawing depicting a detailed configuration of the foreign object detector 13, the second resonator 2, the first resonator 3, and the third resonator 11. The foreign object detector 13 is provided with a voltage measurement circuit 41, a frequency counter 42, an inductance measurement circuit 43, and a determination circuit 44. The second resonator 2 has an inductor L1 and a resonance capacitor C1 connected in series to the inductor L1. The first resonator 3 has an inductor L2, a resonance capacitor C21 connected in series to the conductor L2, and a capacitor C22 connected in parallel to the inductor L2. The first resonator 3 has a parallel resonance circuit that includes the inductor L2 (coil) and the capacitor C22. The third resonator 11 has an inductor L3 and a resonance capacitor C3 connected in series to the inductor L3. In the following description, the inductances of the inductors L1, L2, and L3 are also represented respectively by the symbols L1, L2, and L3. Similarly, the capacitances of the capacitors C1, C21, C22, and C3 are also represented respectively by the symbols C1, C21, C22, and C3. L1 and C1 and also L2 and C21 are set such that the resonance frequencies of the second resonator 2 and the first resonator 3 are f0. L2 and C22 and also L3 and C3 are set such that the resonance frequencies of the first resonator 3 and the third resonator 11 are fr. C22 is set such that the capacitor C22 is substantially open at the frequency f0. C21 is set such that the capacitor C21 is substantially shorted at the resonance frequency fr.

As mentioned above, the foreign object detector 13 can be realized by combining a processor, such as a CPU, and a memory having stored therein a computer program with which the foreign object detection processing in the present embodiment is prescribed, or by a dedicated circuit configured to carry out the same operation. It is not always necessary for the voltage measurement circuit 41, the frequency counter 42, the inductance measurement circuit 43, and the determination circuit 44 in FIG. 7 to be individual circuit elements that are separated. The operation of each element may be realized by one processor executing individual steps in a computer program.

Figure 8:
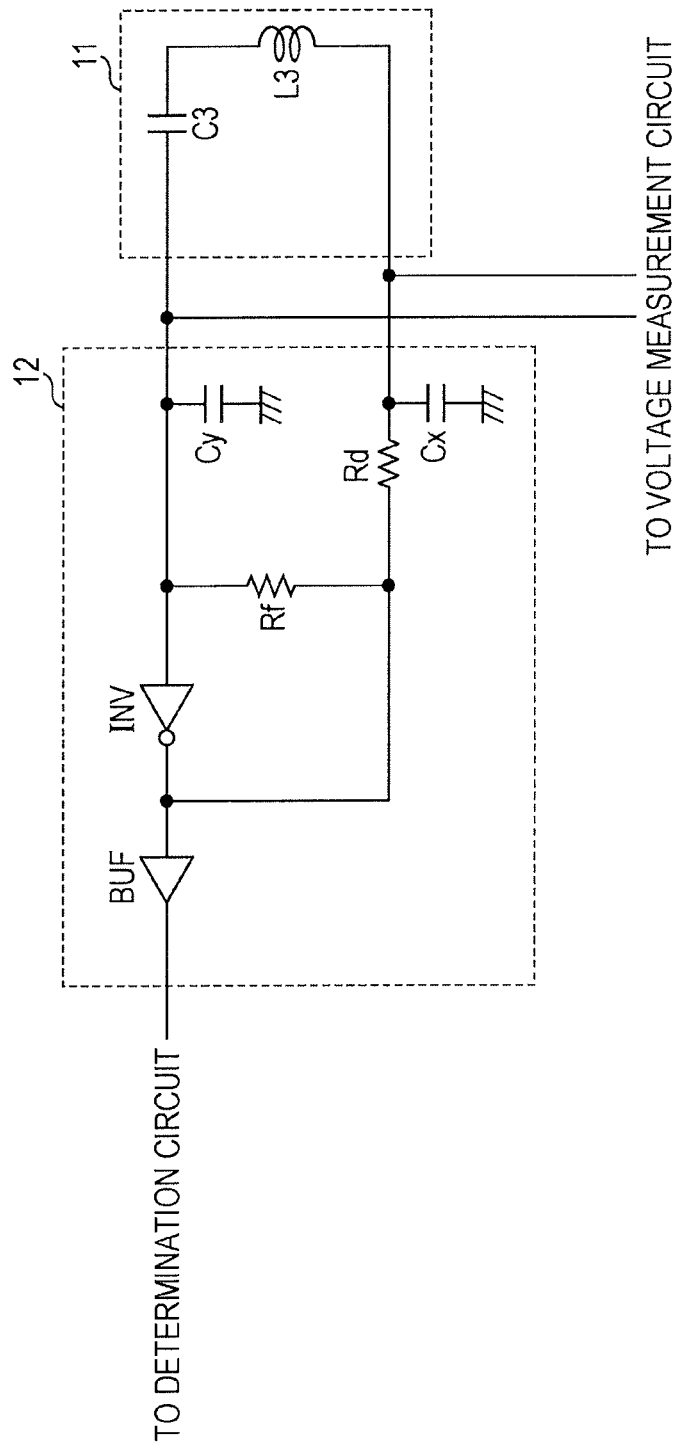
FIG. 8 is a configuration diagram depicting an example of an oscillator according to the first embodiment of the present disclosure.

FIG. 8 is a circuit diagram depicting a configuration example of the oscillator 12. The oscillator 12 in this example is a self-exciting Pearce oscillator. This oscillator 12 is provided with two resonance capacitors Cx and Cy, an inverter INV, resistances Rf and Rd, and a buffer circuit BUF. The inverter INV amplifies and outputs an input waveform by means of power supplied from an undepicted power source. The resistance Rf and the resistance Rd are elements that adjust the circuit excitation level. The present disclosure is not limited to a circuit configuration such as this and an oscillator having another configuration may be used.

When the foreign object detection processing is started, first, the determination circuit 44 sends a trigger signal for starting processing to the power transmission control circuitry 15 and the oscillator 12. This trigger signal is received and the power transmission control circuitry 15 stops the supply of power to the second resonator 2 as previously mentioned. The oscillator 12, which has received the trigger signal, starts oscillating at the frequency f10. When the oscillator 12 starts oscillating and a prescribed time elapses, the voltage measurement circuit 41 measures the voltages of both terminals of the third resonator 11. The voltage measurement circuit 41 outputs a measurement result to the determination circuit 44 and the frequency counter 42. The frequency counter 42 receives the input from the voltage measurement circuit 41 and determines the frequencies (oscillation frequencies) of the voltages of both terminals of the third resonator 11. Information indicating that result is then output to the determination circuit 44. The determination circuit 44 determines whether or not a foreign object is present on the basis of the input voltage information and oscillation frequency information.

If the foreign object is a substance that is likely to block a magnetic field (a ring-shaped metal foreign object, for example), a current having the opposite phase to the coil flows in the metal surface. The input inductance of the third resonator 11 therefore drops. If the input inductance drops, the oscillation frequency of the third resonator 11 becomes higher. Consequently, the determination circuit 44 compares the input frequency and f10 and determines whether or not the difference therebetween is greater than a prescribed threshold value. If that difference is equal to or greater than the threshold value, it can be determined that there is a foreign object. Alternatively, the input inductance of the third resonator 11 may be obtained from the input frequency, and it may be determined that there is a foreign object if that value is equal to or less than the prescribed threshold value.

Furthermore, if the metal foreign object is a substance that is unlikely to block a magnetic field (iron, for example), the value of the input inductance is unlikely to change because the magnetic field passes through the foreign object. However, in a foreign object such as this, an excess current is generated when the magnetic field passes through the foreign object, and a voltage drop occurs at both terminals of the third resonator 11. Therefore, the amplitude of an oscillation voltage drops. Consequently, it can be determined that a foreign object is present if the amplitude of the voltage is equal to or less than the prescribed threshold voltage.

The foreign object detector 13 carries out the same determination also for the case where the oscillator 12 is made to oscillate at the frequency f20. Thus, not only a foreign object in the vicinity of a coil central section but also a foreign object in the vicinity of a coil peripheral section can be detected. The determination circuit 44 determines whether or not a foreign object is present in this manner and outputs the result thereof to the power transmission control circuitry 15.

It should be noted that although foreign object determination is carried out here using both the frequencies of f10 and f20, whether or not a foreign object is present may be determined using only one of these frequencies. For example, it is sufficient for determination to be carried out with only the frequency f10 if it is desired for detection to be carried out only with regard to whether or not a foreign object is present in the vicinity of the central section of the coil of the third resonator 11. Conversely, it is sufficient for determination to be carried out with only the frequency f20 if it is desired for detection to be carried out only for a foreign object in the vicinity of the peripheral section of the coil. If only either one of the frequencies is used to carry out determination, the processing time becomes shorter than when using both of the frequencies. Therefore, there is a practical effect in that the time during which power transmission is stopped can be shortened. Here, the frequency f10 can be set to be equal to or less than 85% of the resonance frequency fr, for example. The frequency f20 can be set to be equal to or greater than 115% of the resonance frequency fr, for example. However, the present disclosure is not limited thereto.

In the above description, with regard to the second resonator 2 and the third resonator 11, a resonance capacitor is connected in series to a coil; however, the present disclosure is not limited to a configuration such as this. The resonance capacitor may be connected in parallel to the coil. Alternatively, the second resonator 2 and the third resonator 11 may include a resonance capacitor that is connected in series to a coil, and a resonance capacitor that is connected in parallel to a coil.

The amplitude of an oscillation voltage, an oscillation frequency, and an inductance value are assumed as measurement items with which determination is carried out; however, the present disclosure is not limited thereto. A foreign object can be similarly detected as long as the measurement item is a physical quantity that is calculated based on these physical quantities. For example, whether or not a foreign object is present may be determined using a characteristic value such as the Q factor of each resonator.

It is therefore possible to provide a power transmission device that can continue transmitting power even with one power reception device having one power reception coil such as a smartphone, and that has an installation base having a small area. Furthermore, it is possible to provide a power transmission device that transmits power continuously with high efficiency.

Furthermore, the foreign object detector not only detects whether or not a foreign object is present between a power transmission coil and a power reception coil but can also detect whether or not a foreign object is present even when a foreign object is near the power transmission coil or the power reception coil.

Thus, power transmission can be continued while preventing a foreign object from overheating even when a foreign object is near the power transmission coil or the power reception coil.

Figure 9:
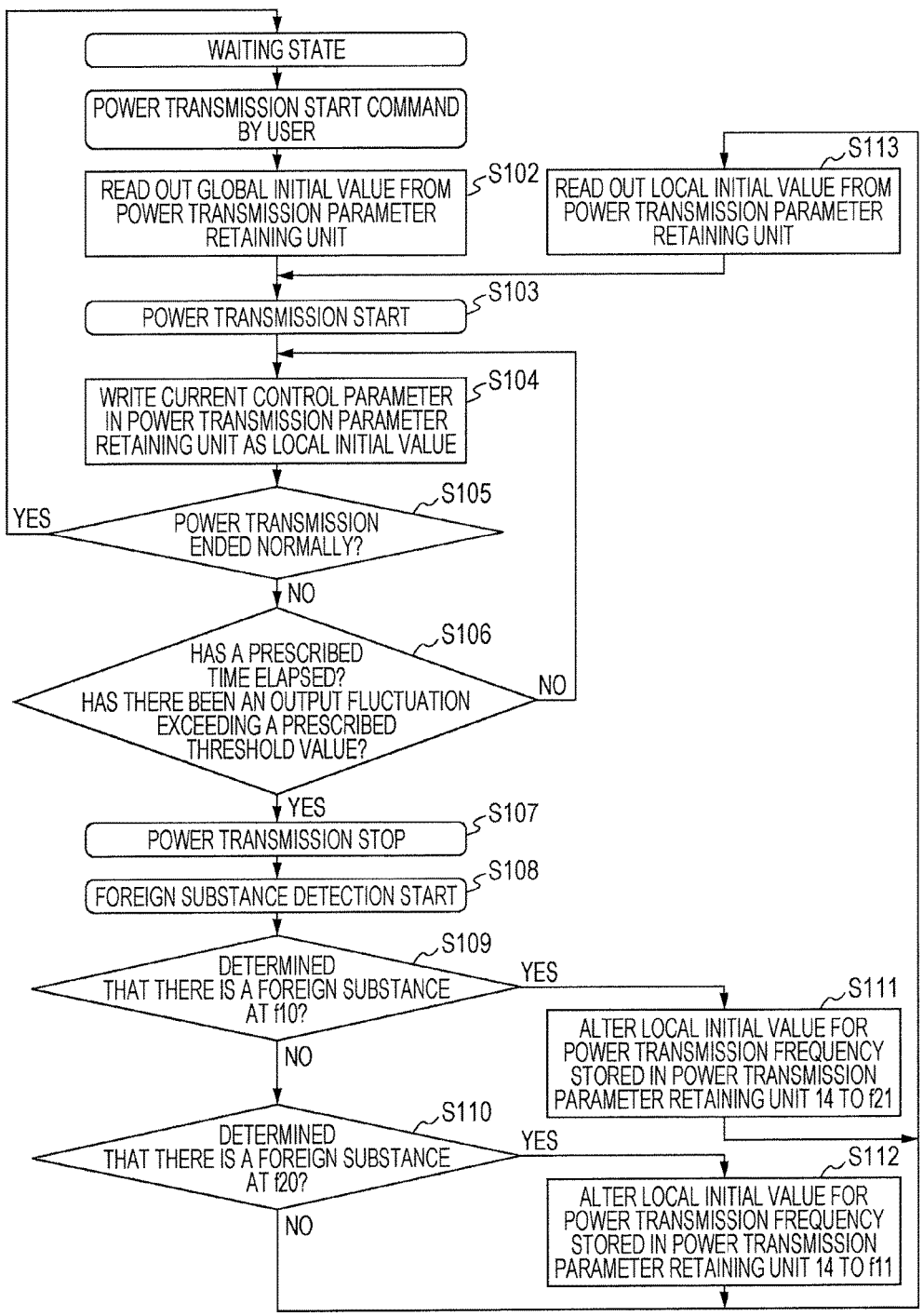
FIG. 9 is a flow diagram depicting an operation of the wireless power transmission system according to the first embodiment of the present disclosure.

Next, the overall control flow for power transmission and foreign object detection will be described with reference to the flowchart of FIG. 9. First, in a waiting state, if a power transmission start command is issued by a user, the power transmission control circuitry 15 reads out the global initial value from the power transmission parameter retaining unit 14 (step S102). Power transmission is then started with that control parameter value (step S103). A power transmission start command issued by a user here is a power transmission trigger being applied to the power transmission circuit 1 as a result of the user turning a switch of the power source 0 to on. Alternatively, the power transmission trigger may be applied to the power transmission circuit as a result of a terminal that is internally equipped with the first resonator 3, the power reception circuit 4, and the load 5 being placed on a power transmission unit that is internally equipped with the power transmission circuit 1, the second resonator 2, and the third resonator 11.

After power transmission has been started, the power transmission control circuitry 15 adjusts the control parameter such that the voltage output to the load 5 becomes fixed as previously mentioned while power is transmitted. The control parameter of that time is then written in the power transmission parameter retaining unit 14 as the local initial value (step S104). When a local initial value has already been recorded, that local initial value is updated. Next, it is determined whether power transmission has ended normally (step S105). The end of power transmission is determined by it being detected that a power transmission stop command has been issued by the user or that charging has been completed in the case where the load is a rechargeable battery, for example. If power transmission has ended normally, processing once again transitions to a waiting state. On the other hand, if power transmission has continued, when foreign object detection is to be carried out regularly, power transmission is stopped and processing transitions to foreign object detection processing after a prescribed time has elapsed from the start of power transmission (steps S106 to S108). Furthermore, even when the prescribed time has not elapsed, the outputs (voltages or the like) of the power transmission circuit 1 and the power reception circuit 4 are monitored, and power transmission is stopped and processing transitions to the foreign object detection processing if those outputs have exhibited a sudden fluctuation that exceeds a prescribed threshold value.

The foreign object detection processing is carried out using the aforementioned method. First, the determination circuit 44 causes the oscillator 12 to oscillate at the frequency f10 and determines whether or not a foreign object is present (step S109). If it is determined that there is a foreign object, the determination circuit 44 alters the local initial value for the power transmission frequency stored in the power transmission parameter retaining unit 14 to f21 (step S111). The power transmission control circuitry 15 reads out that local initial value from the power transmission parameter retaining unit 14 and restarts power transmission at the frequency f21 (steps S113 and S103).

If it is determined in step S109 that there is no foreign object, the determination circuit 44 causes the oscillator 12 to oscillate at the frequency f20 and determines whether or not there is a foreign object (step S110). Here, if it is determined that there is a foreign object, the determination circuit 44 alters the local initial value for the power transmission frequency stored in the power transmission parameter retaining unit 14 to f11 (step S112). The power transmission control circuitry 15 reads out that local initial value from the power transmission parameter retaining unit 14 and restarts power transmission at the frequency f11 (steps S113 and S103).

If it is determined in step S110 that there is no foreign object, the power transmission control circuitry 15 reads out the local initial value from the power transmission parameter retaining unit 14 and restarts power transmission (steps S113 and S103). In this case, power transmission is restarted at the same frequency as the immediately preceding power transmission.

According to the control described above, if it is determined that there is a foreign object, power transmission can be continued at a frequency with which magnetic flux density in the position where there is thought to be a foreign object decreases. Thus, power transmission can be continued while the generation of heat by the foreign object is reduced. On the other hand, if it is determined that there is no foreign object, power transmission can be restarted with the control parameter value from immediately before power transmission was stopped. Therefore, it is no longer necessary for readjustment to be carried out such that the load voltage is fixed. A decline in transmission efficiency can be suppressed compared with the case where power transmission is restarted using the control parameter of the global initial value.

As described above, according to the present embodiment, the generation of heat by a foreign substrate can be reduced and power transmission can thereby be continued even if the foreign object is in the vicinity of a coil. In addition, it is possible to suppress a decline in efficiency due to the initialization of power transmission processing in the case where a foreign object is not detected.

Figure 10:
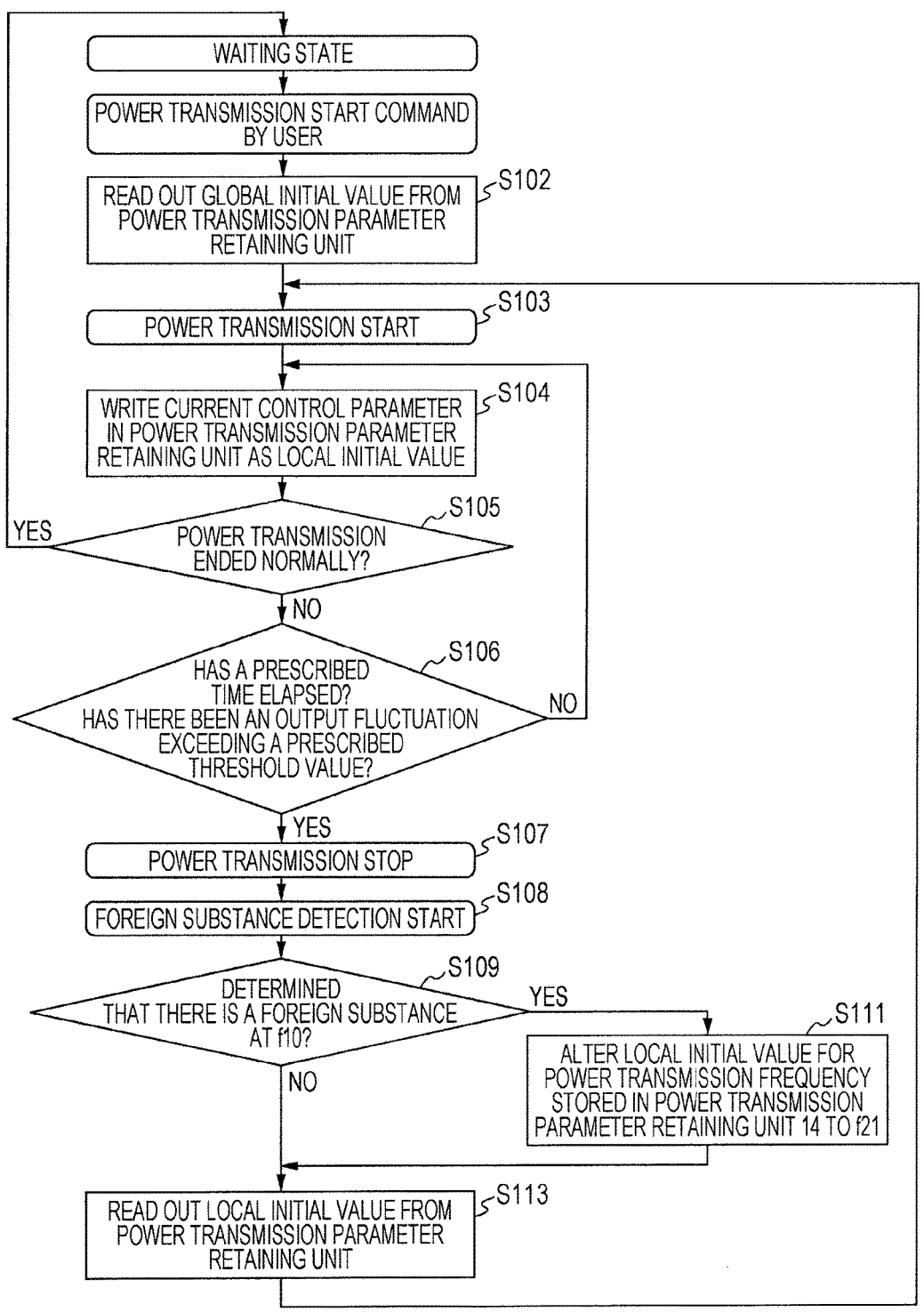
FIG. 10 is a flow diagram depicting an operation in a modified example of the wireless power transmission system according to the first embodiment of the present disclosure.

In the present embodiment, in the foreign object detection processing, it is determined whether or not a foreign object is present using both of the two frequencies f10 and f20; however, as previously mentioned, whether or not a foreign object is present may be determined using at least only one of these frequencies. FIG. 10 is a flowchart depicting an operation when foreign object detection is carried out only with the frequency f10. In this example, if it is determined in step S109 that there is no foreign object, a determination besides this is not carried out and power transmission restarts using the control parameter in the immediately preceding power transmission. Even an operation such as this is effective since a decline in transmission efficiency due to a foreign object in the vicinity of the central section of a coil can be suppressed. Steps S109 and S111 in FIG. 10 may be substituted with a step in which foreign object detection is carried out with the frequency f20 (steps S110 and S112 in FIG. 9). In such case, a decline in transmission efficiency due to a foreign object in the vicinity of the peripheral section of a coil can be suppressed.

In the present embodiment, a control parameter used during power transmission is recorded as the local initial value and used during the next power transmission; however, an operation such as this is not essential. If the local initial value is not recorded and it is determined that there is no foreign object, power transition may be restarted with the control parameter being returned to the global initial value. In this case also there is an effect in that, when a foreign object is detected, power transmission can be restarted at a frequency with which magnetic flux in the position where there is thought to be a foreign object decreases.

The present embodiment has been implemented on the premise that foreign object detection is carried out; however, it is not necessary for information explicitly indicating whether or not a foreign object is present to be output. If a voltage that is output from the oscillator 12 or a physical quantity that changes according to this has greatly changed from a prescribed reference value, it is sufficient as long as a configuration is implemented such that a control parameter such as a power transmission frequency is set to an appropriate value.

Embodiment 2

Figure 11:
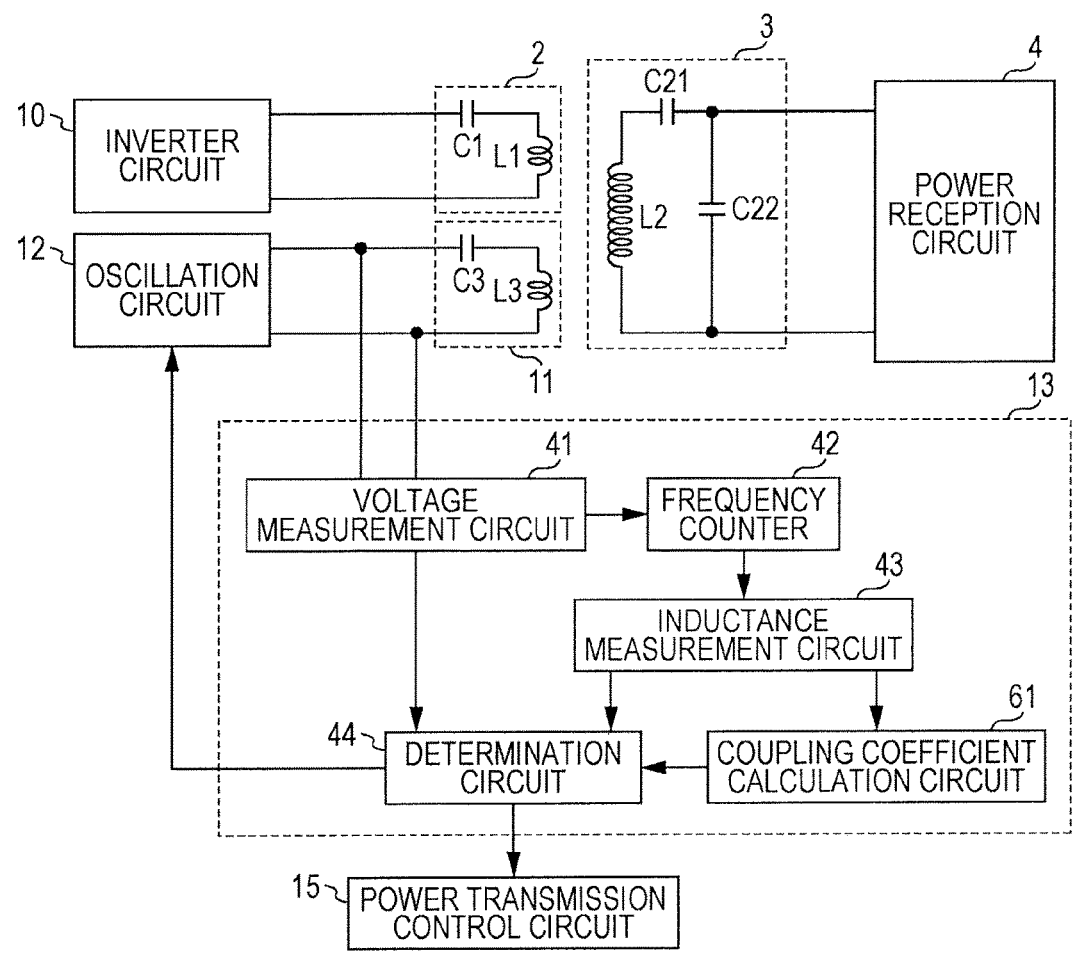
FIG. 11 is a configuration diagram depicting a foreign substance detector according to a second embodiment of the present disclosure.

FIG. 11 is a drawing depicting a configuration of a foreign object detector 13 in embodiment 2 of the present disclosure.

The present embodiment is different from embodiment 1 in that the foreign object detector 13 detects a foreign object on the basis of a coupling coefficient between a third resonator 11 and a first resonator 3. Hereinafter, a description is given primarily with regard to differences with embodiment 1 and descriptions of common matters are omitted.

The foreign object detector 13 in the present embodiment has an inductance measurement circuit 43 that measures an input inductance value of the third resonator 11, and a coupling coefficient calculation circuit 61 that calculates a coupling coefficient. The coupling coefficient calculation circuit 61 calculates a coupling coefficient k on the basis of a ratio between an input inductance value Lin(f10) of the third resonator 11 measured by the inductance measurement circuit 43 when an oscillator 12 is oscillating at a frequency f10, and an input inductance value Lin(f20) of a second resonator 2 measured by the inductance measurement circuit 43 when the oscillator 12 is oscillating a frequency f20. It is possible to detect a foreign object between the third resonator 11 and the first resonator 3 on the basis of this coupling coefficient k.

The coupling coefficient k changes depending on the foreign object between the third resonator 11 and the first resonator 3. For example, when a metal foreign object that completely blocks a magnetic field is present between coils and the second resonator 2 and the third resonator 11 are not electromagnetically coupled, the coupling coefficient k has a low value that is 0 or approximately 0. On the other hand, if a metal foreign object is not present between coils, the coupling coefficient k has a value that is greater than 0 and equal to or less than 1. Therefore, whether or not a foreign object is present between the third resonator 11 and the first resonator 3 can be decided based on a calculated value or an estimated value for the coupling coefficient k.

When the third resonator 11 (coil inductance L3) and the first resonator 3 (coil inductance L2), which resonates at a resonance frequency fr, are electromagnetically coupled with the coupling coefficient k, an input inductance Lin seen from the coil L3 of the third resonator 11 is obtained with the following expression.

$$Lin(f)=L3\{1-k^2/(1-(fr/f)^2)\} \quad \text{Expression 1}$$

Figure 12:
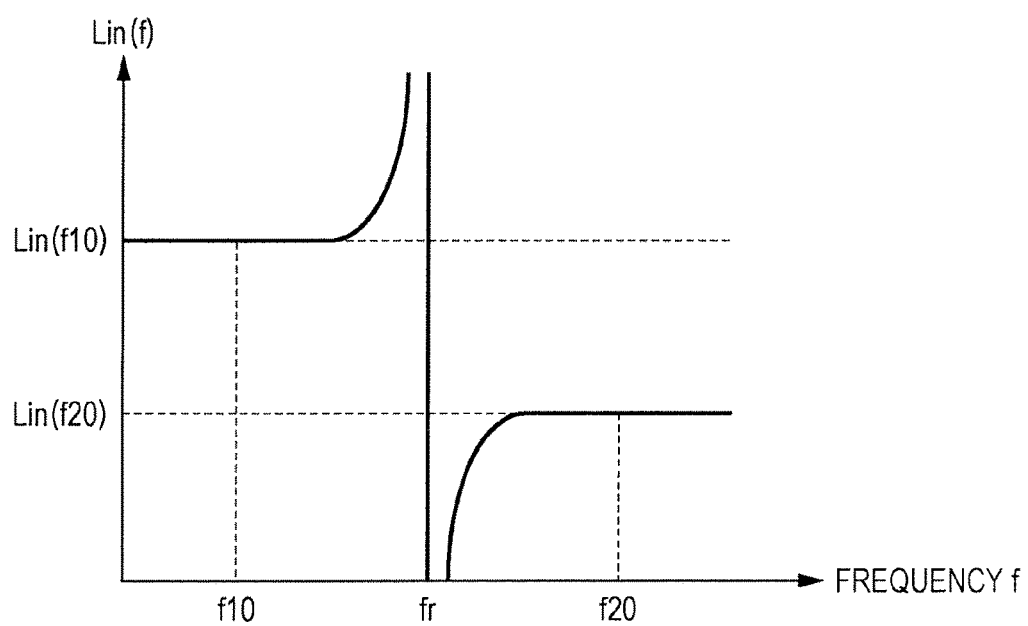
FIG. 12 is a graph depicting the frequency dependency of an input inductance of a third resonator when the third resonator and a second resonator according to the second embodiment of the present disclosure are electromagnetically coupled.

FIG. 12 is a graph schematically depicting expression 1.

When frequency f>>fr, it appears as if both terminals of the first resonator 3 are substantially open. An input inductance value measured at the frequency f10, which is lower than fr, is taken as Lin(f10). On the other hand, it appears as if both terminals of a parallel capacitor in the first resonator 3 are substantially shorted when frequency f>>fr. An input inductance value measured at the frequency f20, which is higher than fr, is taken as Lin(f20).

The following approximate expressions are obtained from expression 1 when the magnitudes of f10 and f20 are set appropriately.

$$Lin(f10) \approx L3$$

$$Lin(f20) \approx L3(1-k^2)$$

The following expression 2 is obtained from these two approximate expressions.

$$k^2 \approx 1-Lin(f20)/Lin(f10) \quad \text{Expression 2}$$

According to this expression 2, the coupling coefficient k can be calculated based on a ratio between Lin(f10) and Lin(f20), which are measured values. However, expression 2 is based on the particular condition that the relationships of the following expressions 3 and 4 are established between an input inductance Lin_open(f) for the case where a coil terminal of the first resonator 3 is completely open and an input inductance Lin_short(f) for the case where a power reception coil terminal is completely shorted.

$$Lin\_open(f10)=Lin\_open(f20) \quad \text{Expression 3}$$

$$Lin\_short(f10)=Lin\_short(f20) \quad \text{Expression 4}$$

Conversely, if a wireless power transmission system is designed with appropriate frequencies f10 and f20 with which expressions 3 and 4 are established having been selected, expression 2 is established and it becomes possible to estimate the coupling coefficient k. Ordinarily, there is no problem in terms of practical use as long as these frequencies f10 and f20 are set within a frequency range with which the dimensions of a resonator are considered to be sufficiently small compared with a wavelength.

It should be noted that, when a self-exciting oscillator is used, the change in an input inductance is directly converted into a change in an oscillation frequency. The input inductance is determined by the inverse of the square of the oscillation frequency, and the coupling coefficient k can therefore be rewritten with the following expression.

$$k^2 \approx 1-f10^2/f20^2 \quad \text{Expression 5}$$

In terms of practical use, it is necessary for expression 2 and expression 5 to be corrected since linear/non-linear circuit elements and the like are included, but in principle it is possible for the coupling coefficient k to be estimated from these expressions.

Based on the above, if an oscillation frequency or an input inductance value at two frequencies is measured while continuously switching operations with which oscillation is performed at each frequency of f10 and f20, the coupling coefficient k can be estimated from the measurement result. The coupling coefficient k changes according to a magnetic field blocking state caused by a metal foreign object between the third resonator 11 and the first resonator 3. Consequently, for example, if an estimated coupling coefficient k has become equal to or less than a prescribed threshold value, it can be determined that a metal foreign object is present between the first resonator 3 and the third resonator 11.

Here, the coupling coefficient k changes not only according to whether or not a foreign object is present but also if the positional relationship between the first resonator 3 and the third resonator 11 changes. For example, if a design has been implemented such that the coupling coefficient is at its largest when the central axes of both coils are aligned, the value of the coupling coefficient k decreases when the central sections of both coils have deviated. Consequently, in the case where it is determined that there is no foreign object using foreign object determination processing, if the coupling coefficient decreases to an extent but is still is higher than the threshold value, it is thought that the position of the coil at the power reception side has deviated from a suitable position. Therefore, taking positional deviation into consideration when power transmission is restarted, a control parameter such as the power transmission frequency may be corrected for power transmission to be carried out. A decline in transmitted power and power transmission efficiency can thereby be prevented.

Figure 13:
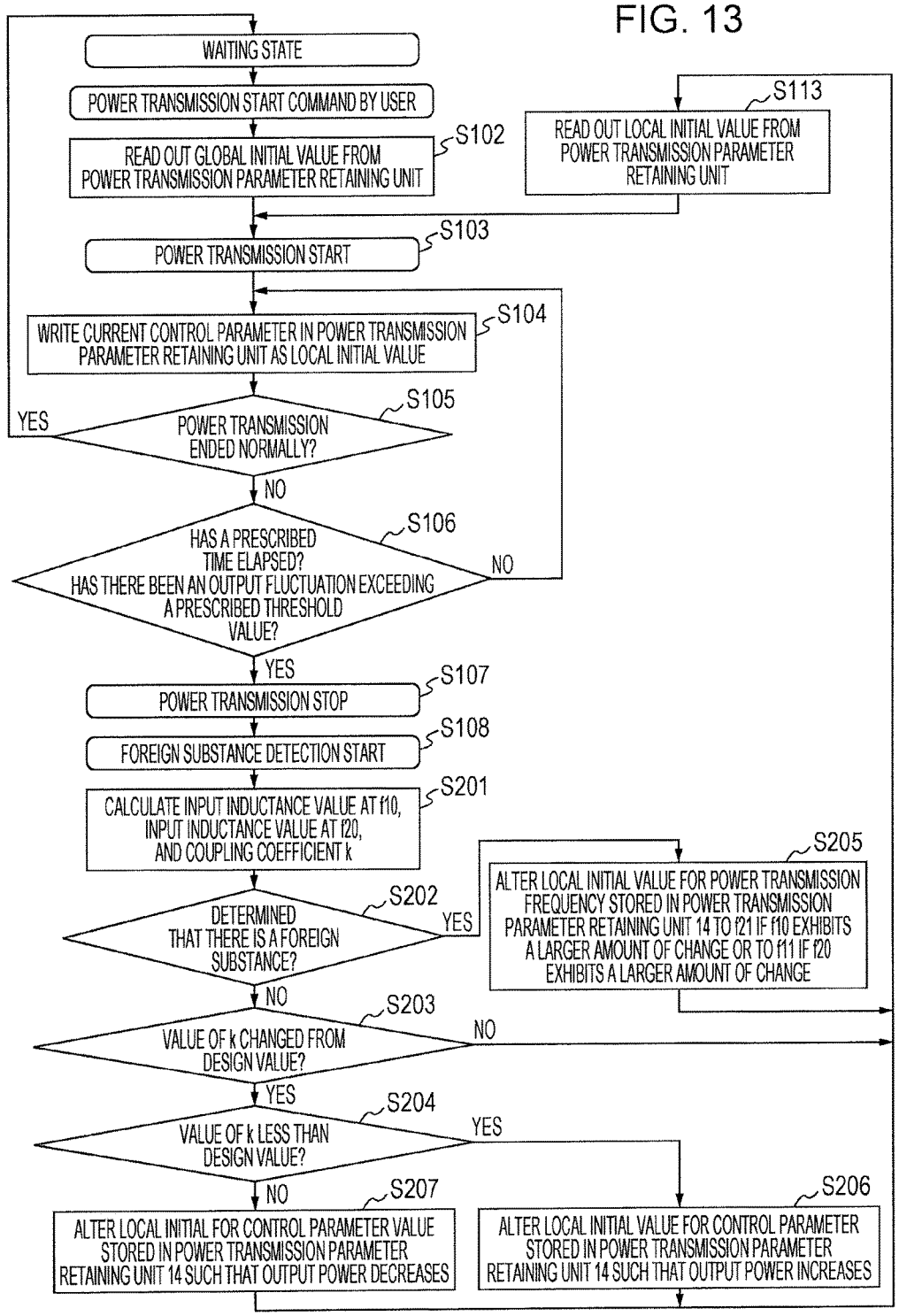
FIG. 13 is a flow diagram depicting an operation of the wireless power transmission system according to the second embodiment of the present disclosure.

Next, the overall control for foreign object detection and power transmission based on this coupling coefficient k is described with reference to the flowchart of FIG. 13. Steps S102 to S108 and S113 in FIG. 13 are the same as the corresponding steps in FIG. 9 and therefore descriptions thereof are omitted.

The foreign object detection processing in the present embodiment includes, in addition to the aforementioned processing, steps S201 and S202 in which a coupling coefficient k is obtained from a ratio between input inductance values produced when oscillation is performed at the frequency f10 and the frequency f20, respectively, and it is determined whether or not a foreign object is present on the basis of the coupling coefficient k. In step S202, the determination circuit 44 determines that there is a foreign object when the coupling coefficient k is equal to or less than a prescribed threshold value, for example. Although not depicted in FIG. 13, whether or not a foreign object is present may be determined by comprehensively taking into consideration not only the coupling coefficient k but also a fluctuation in another physical quantity such as a voltage or a frequency. If it is determined that there is a foreign object, the determination circuit 44 obtains the frequency exhibiting the greater amount of change from a reference value from among the input inductance value Lin(f10) at the frequency f10 and the input inductance value Lin(f20) at the frequency f20. If f10 exhibits the greater amount of change, the local initial value for the power transmission frequency stored in the power transmission parameter retaining unit 14 is altered to f21. If f20 exhibits the greater amount of change, the local initial value for the power transmission frequency stored in the power transmission parameter retaining unit 14 is altered to f11 (step S205). Thereafter, the power transmission control circuitry 15 reads out the local initial value from the power transmission parameter retaining unit 14 and restarts power transmission (steps S113 and S103).

In step S202, if it is determined that there is no foreign object, the determination circuit 44 compares the calculated coupling coefficient k and a designed coupling coefficient and determines whether or not the coupling coefficient k has changed from the designed coupling coefficient (step S203). At such time, it is determined that the coupling coefficient k has changed from the designed coupling coefficient when the difference between the coupling coefficient k and the designed coupling coefficient (design value) is greater than a prescribed threshold value. If the coupling coefficient k has changed from the designed coupling coefficient, it is determined whether or not the value of that coupling coefficient k is less than the designed coupling coefficient (step S204). If the calculated coupling coefficient k is less than the designed coupling coefficient, the determination circuit 44 alters the local initial value stored in the power transmission parameter retaining unit 14, such that the transmitted power increases (step S206). Conversely, if the calculated coupling coefficient k is greater than the designed coupling coefficient, the local initial value stored in the power transmission parameter retaining unit 14 is altered such that the transmitted power decreases (step S207). The power transmission control circuitry 15 restarts power transmission with the altered control parameter (steps S113 and S103).

The alteration of the local initial value can be carried out by subjecting each control parameter to a calculation using a linear correction expression in which the ratio between the calculated coupling coefficient k and the designed coupling coefficient is multiplied by a correction coefficient, for example. A table of control parameters with which output becomes suitable for each coupling coefficient value may be prepared in advance, and a suitable control parameter may be decided by referring to the table.

According to the processing described above, if it is determined that there is a foreign object, power transmission can be continued at a frequency with which magnetic flux density in the position where there is thought to be a foreign object decreases. Thus, power transmission can be continued while the generation of heat by a foreign object is reduced. On the other hand, if a positional deviation of the coil at the power reception side has occurred even though it is determined that there is no foreign object, the effect caused by the positional deviation can be reduced.

As described above, according to the present embodiment, the generation of heat by a foreign substrate can be reduced and power transmission can thereby be continued even when a foreign object is in the vicinity of a coil. In addition, a decline in power transmission efficiency and a decline in power can be suppressed also when a foreign object is not detected.

Embodiment 3

Figure 14:
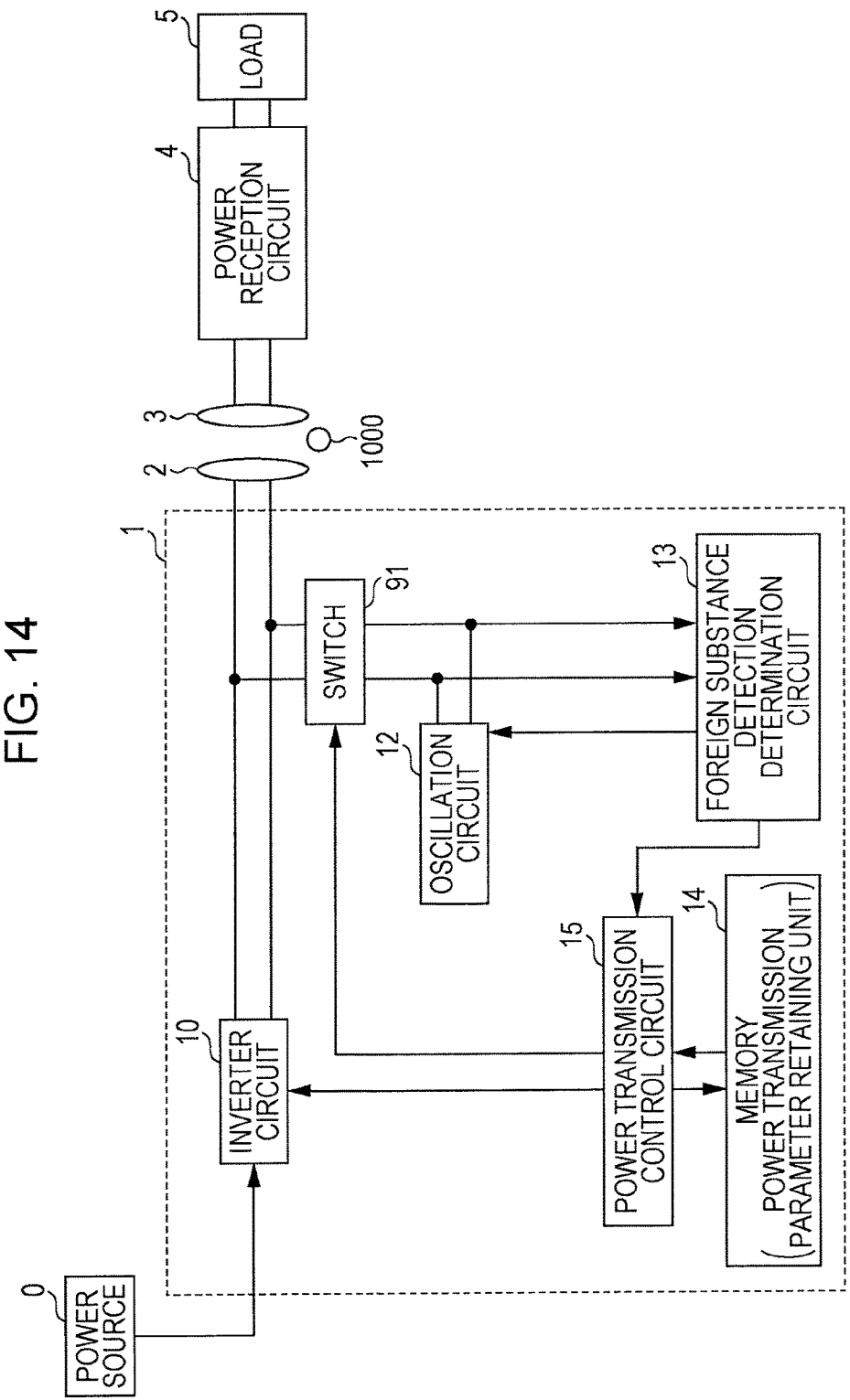
FIG. 14 is a configuration diagram of a wireless power transmission system according to a third embodiment of the present disclosure.

FIG. 14 is a drawing depicting a configuration of a wireless power transmission system in embodiment 3 of the present disclosure. The present embodiment is different from embodiments 1 and 2 in that a second resonator 2 is also provided with the function of a third resonator 11. A system in which the second resonator 2 and the third resonator 11 are realized by using one resonator as in the present embodiment can also be said to be provided with the second resonator 2 and the third resonator 11. Hereinafter, a description is given primarily with regard to differences with embodiment 1 or 2 and descriptions of common matters are omitted.

A power transmission circuit 1 in the present embodiment is provided with a switch 91 connected between an oscillator 12 and foreign object detector 13 and the second resonator 2. In the foreign object detection mode, the switch 91 connects the oscillator 12 and foreign object detector 13 with the second resonator 2. In the power transmission mode, the switch 91 disconnects the oscillator 12 and foreign object detector 13 from the second resonator 2. The mode switching is carried out with a command signal from a power transmission control circuitry 15.

Foreign object detection processing is carried out with the same flow as either of embodiment 1 or 2. However, because the second resonator 2 is provided with the functions of both power transmission and foreign object detection, if the frequency used for foreign object detection is different from the power transmission frequency, it is necessary for the resonance frequency to be switched. Therefore, an inductor or resonance capacitor for switching the resonance frequency can be newly connected to the second resonator 2.

Figure 15:
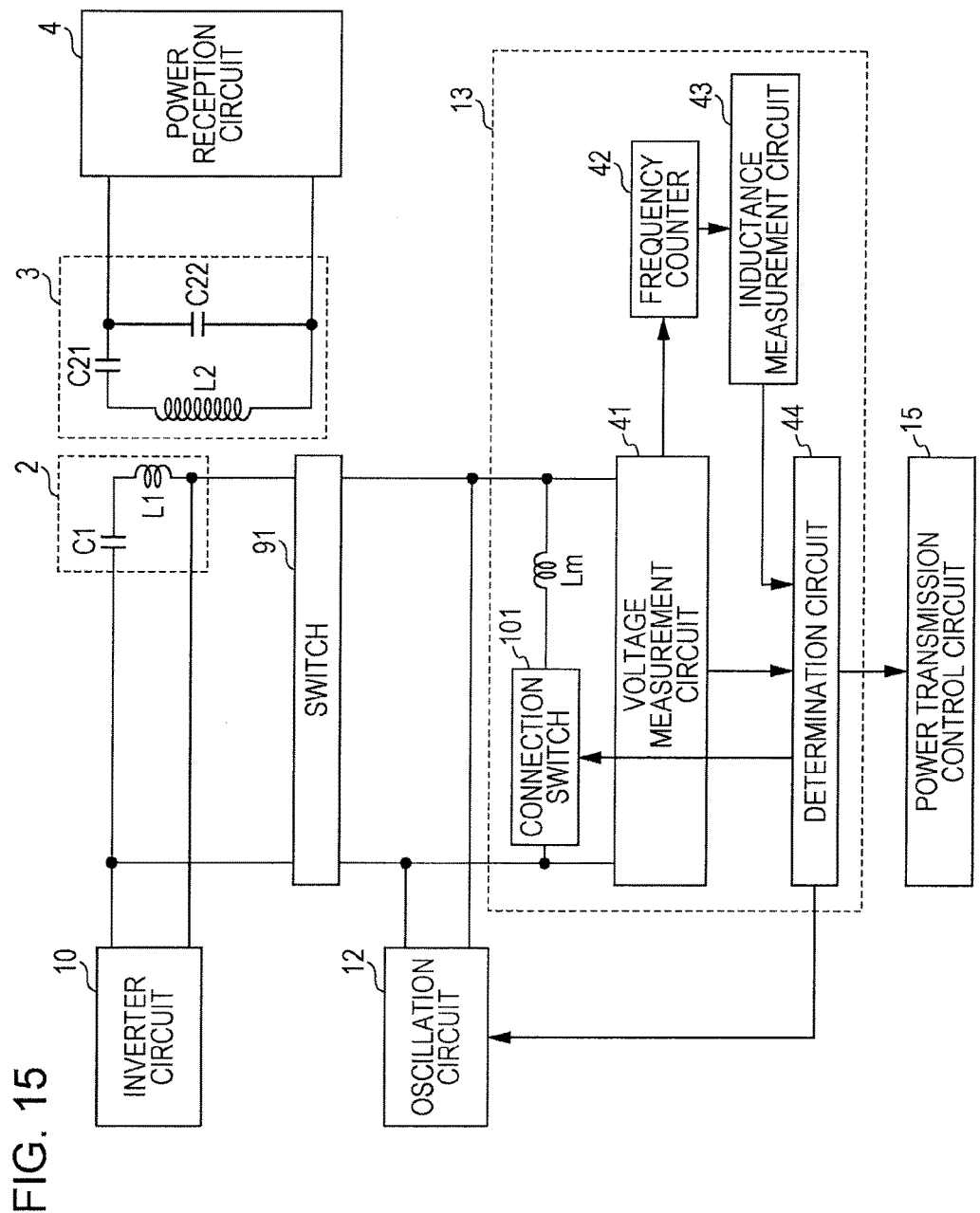
FIG. 15 is a configuration diagram depicting a foreign substance detector according to the third embodiment of the present disclosure.

FIG. 15 is a drawing depicting a detailed configuration example of the foreign object detector 13 in the present embodiment. This foreign object detector 13 has a connection switch 101 for connecting an inductor Lm to the second resonator 2. The inductor Lm is connected in parallel to the second resonator 2 when the connection switch 101 is on. The inductance value of the inductor Lm is set such that there is a resonance frequency fr at which a resonance capacitor C21 of a first resonator 3 appears to be substantially shorted, when the connection switch 101 is on. Thus, in the second resonator 2, the resonance frequency with the first resonator 3 becomes f0 when the connection switch 101 is off, and the resonance frequency with the first resonator 3 becomes fr when the connection switch 101 is on.

According to a configuration such as this, a method the same as that in the aforementioned embodiment 1 or 2 can be applied with the switch 91 in a connected state when foreign object detection processing is to be carried out. For example, it can be determined whether or not there is a metal foreign object on the basis of an input inductance value Lin(f10) of the second resonator 2 that is produced when the connection switch 101 is off and the oscillator 12 is oscillating at a frequency f10, which is lower than fr, and an input inductance value Lin(f20) seen from the second resonator 2 when the connection switch 101 is on and the oscillator 12 is oscillating at a frequency f20, which is higher than fr. It should be noted that although a configuration in which the inductor Lm can be added in order to switch frequencies is employed for the configuration of the present embodiment, another configuration may be employed. For example, a configuration in which a resonance capacitor can be added or a configuration in which an inductor and a resonance capacitor can both be added may be employed.

In the configuration depicted in FIG. 15, if a foreign object is to be detected based on a coupling coefficient k, the following expression 6 in which expression 5 has been corrected can be used.

$$k \approx 1 - f10^2/(f20^2 - f30^2) \qquad \text{Expression 6}$$

Here, a frequency f30 is an oscillation frequency for the case where the switch 91 is off and the connection switch 101 is on. In other words, measuring the frequency f30 is equivalent to measuring the inductance value of the adjustment inductor Lm. When the oscillator 12 is oscillating at the frequency f20, that oscillation frequency includes a component based on the input inductance value of a coil L1 and a component based on the inductance value of the adjustment inductor Lm. Therefore, a coupling coefficient is calculated with the effect of the adjustment inductor Lm having been removed in the denominator of the second term of expression 6. In this manner, a foreign object may be detected based on a coupling coefficient k that is calculated by using, instead of expression 5, correction expression 6 that is based on expression 5. It should be noted that there are a variety of circuit topologies for a self-exciting LC oscillator, and therefore the correction expression is not limited to expression 6. For example, there is a circuit topology in which the oscillation frequency is altered by switching capacitors Cx and Cy depicted in FIG. 8 for different capacitors. The calculation of the correction expression for expression 5 is simple even if a different circuit topology is adopted. Similarly, also in the case where expression 2 is to be used, the coupling coefficient k may be calculated using a correction expression in which expression 2 is corrected according to the circuit topology.

According to the present embodiment, a coil for power transmission and a coil for foreign object detection can be combined, and the size of the device can therefore be reduced. Power transmission can be continued by reducing the generation of heat even when a foreign object is in the vicinity of coil, and a decline in power transmission efficiency and a decline in power can be suppressed also when there is no foreign object.

Embodiment 4

Figure 16:
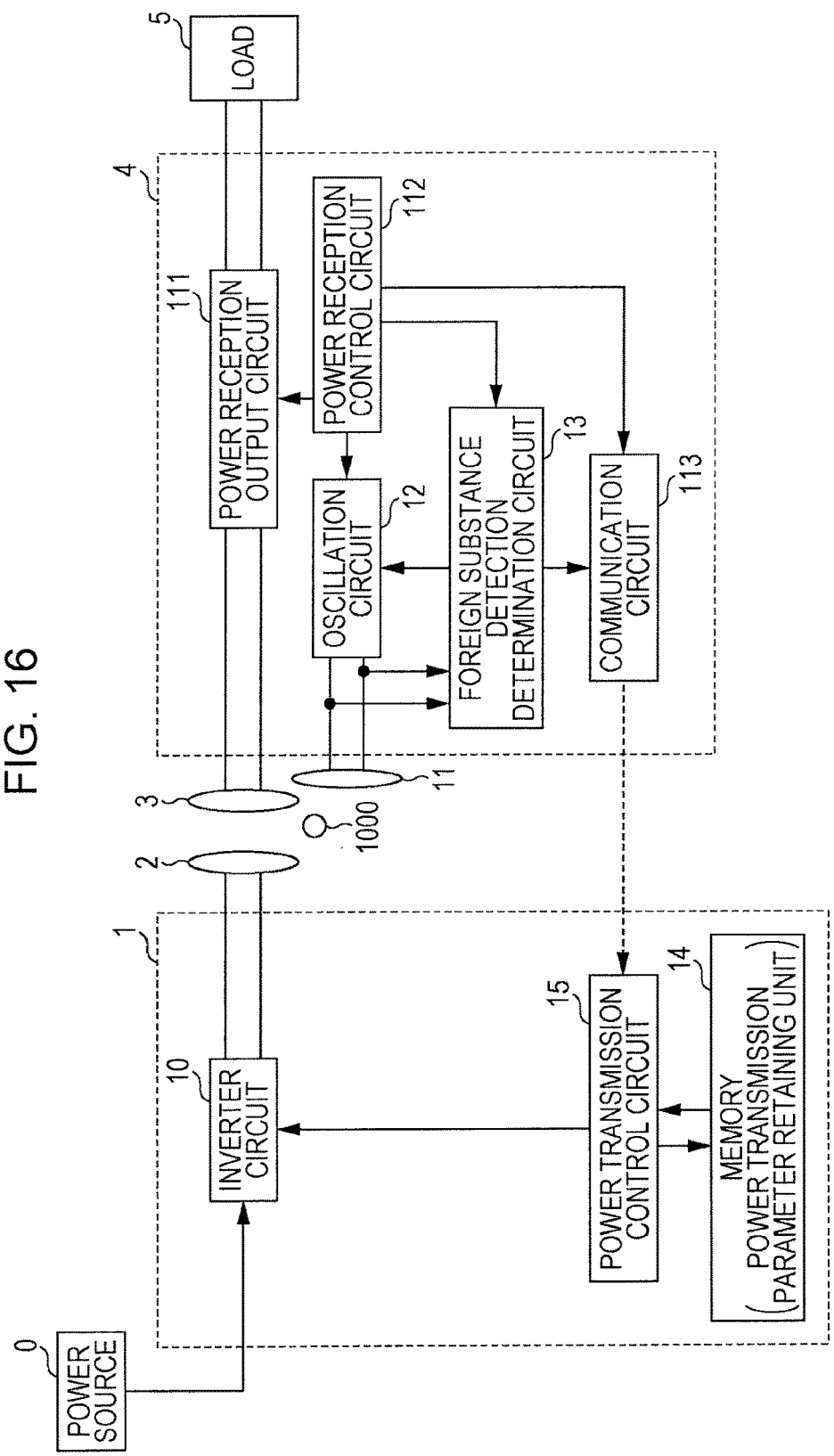
FIG. 16 is a configuration diagram of a wireless power transmission system according to a fourth embodiment of the present disclosure.

FIG. 16 is a drawing depicting a configuration of a wireless power transmission system in embodiment 4 of the present disclosure. The present embodiment is different from embodiments 1, 2, and 3 in that constituent components for detecting a foreign object rather than a power transmission circuit 1 are mounted in a power reception circuit 4 rather than the power transmission circuit 1. Hereinafter, a description is given primarily with regard to differences with embodiments 1, 2, and 3 and descriptions of common matters are omitted.

In the present embodiment, a third resonator 11, an oscillator 12, and a foreign object detector 13, which are configurations for foreign object detection, are mounted in the power reception circuit 4. Furthermore, a second resonator 2 rather than a first resonator 3 is provided with a parallel resonance capacitor. During foreign object detection processing, the foreign object detector 13 determines whether or not there is a metal foreign object on the basis of changes in the input impedance of the third resonator 11 while the second resonator 2 and the third resonator 11 are electromagnetically coupled. The resonance frequencies of the second resonator 2 and the third resonator 11 are set to fr. The parallel resonance capacitor of the second resonator 2 is set to a value at which the parallel resonance capacitor becomes substantially open at the frequency used during power transmission.

There are cases where the power reception-side device is large compared with the power transmission-side device. For example, there are cases where a large power reception-side device such as a tablet terminal is charged from a small power transmission-side device. In a case such as this, when the power transmission-side device is using a display element for notifying the presence of a foreign object, the display element is hidden by the power reception-side device and it is difficult to confirm whether or not a foreign object is present. This problem can be resolved by implementing a configuration in which foreign object determination is carried out by the power reception-side device and the result thereof is displayed on the display element of the power reception-side device to notify the user.

The power reception circuit 4 is provided with a power reception output circuit 111 and a power reception control circuit 112. The power reception output circuit 111 can include a variety of circuits such as a rectification circuit, a frequency conversion circuit, and a constant voltage/constant current control circuit. The power reception output circuit 111 converts received AC energy into DC energy that can be used by a load 5 or into AC energy of a low frequency. The power reception control circuit 112 is a circuit that controls the overall operation of the power reception circuit 4.

An operation of the foreign object detection processing in the present embodiment is described. The processing up to the foreign object detection processing being started is the same as the aforementioned processing in embodiment 1. Here, a description is given from the processing in which the foreign object detection processing is started.

As in embodiment 1, the power transmission control circuitry 15 stops power transmission by the inverter 10 when the foreign object detection processing is started. The stopping of the power transmission is carried out by a stop signal being sent to the power transmission control circuitry 15 from the power reception control circuit 112 by way of a communication circuit 113. The stop signal from the power reception control circuit 112 is also sent to the power reception output circuit 111. The power reception output circuit 111 switches the output circuit such that output impedance becomes substantially open. For example, if the power reception output circuit 111 is a synchronous rectification circuit configured of switching elements, the switching elements are all turned off. Alternatively, the power reception output circuit 111 may be configured such that the output terminal is switched to a high-impedance resistance circuit.

Next, the power reception control circuit 112 sends a signal to the oscillator 12 and causes the oscillator 12 to oscillate at frequencies f10 and f20. During that process, the foreign object detector 13 measures the oscillation frequency of the third resonator 11. Whether or not a foreign object is present is determined based on the input impedance of the third resonator 11 obtained from that oscillation frequency. Next, the foreign object detector 13 sends information indicating a determination result to the power transmission control circuitry 15 by way of the communication circuit 113. As in embodiment 1, in accordance with the determination result, the power transmission control circuitry 15 alters a local initial value retained in a power transmission parameter retaining unit 14 and starts power transmission.

According to the present embodiment, the user can be notified as to whether or not a foreign object is present, by way of a display element (a display or a lamp or the like) mounted in the power reception-side device. In addition, the generation of heat can be reduced and power transmission can thereby be continued even when a foreign object is in the vicinity of a coil. A decline in power transmission efficiency and a decline in power can be suppressed also when there is no foreign object. It should be noted that the configuration of the present embodiment is not limited to the case where the power reception-side device is larger than the power transmission-side device and can also be adopted in the case where the power reception-side device is small.

The embodiments disclosed herein are exemplary in all respects and are not intended to limit the present disclosure. The scope of the present disclosure is determined not by the above description but by the scope of the patent claims and is intended to encompass all aspects including meanings that are equivalent to the scope of the patent claims and modifications within the scope.

The present disclosure includes a power transmission device and a wireless power transmission system provided with the power transmission device as described in the following items.

[Item 1]

A power transmission device that transmits first AC power in a noncontact manner to a power receiving device having a first resonator, the first resonator receiving the first AC power, the power transmission device comprising:

a second resonator that electromagnetically couples with the first resonator to transmit the first AC power to the first resonator;

a third resonator that electromagnetically couples with the first resonator to transmit second AC power to the first resonator;

an inverter that generates the first AC power by using either a frequency f11 or a frequency f12, the frequency f11 being lower than a first resonance frequency f0 between the first resonator and the second resonator, the frequency f12 being higher than the first resonance frequency f0;

an oscillator that generates the second AC power by using either a frequency f10 or a frequency f20, the frequency f10 being lower than a second resonance frequency fr between the first resonator and the third resonator, the frequency f20 being higher than the second resonance frequency fr;

a foreign object detector that determines whether or not a foreign object is present between the first resonator and the third resonator based on a physical quantity in the third resonator that changes according to the second AC power of either the frequency f10 or the frequency f20; and power transmission control circuitry operative to:

set a foreign object detection period in which foreign object is detected by the foreign object detector, between i) a first power transmission period in which the first AC power is transmitted from the second resonator to the first resonator and ii) a second power transmission period subsequent to the first power transmission period;

set to the inverter, one of the frequency f11 or the frequency f12 in the first power transmission period; and set to the inverter, the other of the frequency f11 or the frequency f12 in the second power transmission period if it is determined that the foreign object is present in the foreign object detection period.

According to the aforementioned aspect, either one of the frequency f11 and the frequency f12 is used in the first power transmission period.

If power is being transmitted at the frequency f11 in the first power transmission period, the magnetic field of a central section A between the coil of the first resonator and the coil of the second resonator becomes dense and the magnetic field of a peripheral section B becomes sparse, as depicted in FIG. 5A. Thus, power is being transmitted in a state in which the magnetic field of the central section A is dense and the magnetic field of the peripheral section B is sparse. To rephrase, power is being transmitted for the most part by the magnetic field of the central section A.

Either one of the frequency f10 and the frequency f20 is used in the foreign object detection period.

If oscillation is being performed at the frequency f10 in the foreign object detection period, the magnetic field of the central section A between the coil of the second resonator and the coil of the third resonator becomes dense and the magnetic field of the peripheral section B becomes sparse, as depicted in FIG. 5A.

Thus, if it is determined that a foreign object is present when oscillation is being performed at the frequency f10, it is understood that the foreign object is present in the central section A. Thus, in the second power transmission period, by transmitting power at the frequency f12, which has a magnetic field distribution in which the magnetic field of the central section A is sparse and the magnetic field of the peripheral section B is dense, power can be transmitted with high efficiency while the generation of heat by the foreign object is suppressed.

On the other hand, if power is being transmitted at the frequency f12 in the first power transmission period, the magnetic field of the central section A between the coil of the first resonator and the coil of the second resonator becomes sparse and the magnetic field of the peripheral section B becomes dense, as depicted in FIG. 5B. Thus, power is being transmitted in a state in which the magnetic field of the central section A is sparse and the magnetic field of the peripheral section B is dense. To rephrase, power is being transmitted for the most part by the magnetic field of the peripheral section B.

Thus, if it is determined that a foreign object is present when oscillation is being performed at the frequency f20, it is understood that the foreign object is present in the peripheral section B. Thus, in the second power transmission period, by transmitting power at the frequency f11, which has a magnetic field distribution in which the magnetic field of the central section A is dense and the magnetic field of the peripheral section B is sparse, power can be transmitted with high efficiency while the generation of heat by the foreign object is suppressed.

To summarize the above, if it is determined that a foreign object is present in the foreign object detection period, the inverter is instructed to use, in the second power transmission period, the frequency f11 or the frequency f12 that is a different frequency from the frequency used in the first power transmission period. By then causing the transmission of the first AC power to be started, power can be transmitted continuously with high efficiency while the foreign object is prevented from overheating.

Furthermore, because the power transmission device can be realized with only one power transmission coil, power can be transmitted even with a power reception device having one power reception coil such as a smartphone, and a power transmission device that has an installation base having a small area can be realized.

[Item 2]

The power transmission device according to item 1, in which, if it is determined that the foreign object is not present in the foreign object detection period, the power transmission control circuitry sets to the inverter, in the second power transmission period, the frequency f11 or the frequency f12 that is the same frequency as the frequency used in the first power transmission period, and causes the inverter to start to transmit the first AC power at the set one of the frequency f11 and the frequency f12.

According to the aforementioned aspect, if it is determined that a foreign object is not present in the foreign object detection period, the frequency f11 or the frequency f12 that is the same frequency as the frequency used in the first power transmission period is used in the second power transmission period.

Thus, because the same the frequency as in the first power transmission period is used also in the second power transmission period, it is not necessary for the frequency to be altered. Thus, the starting of the power transmission in the second power transmission period can be carried out quickly.

[Item 3]

The power transmission device according to item 1 to 2, in which, if it is determined that the foreign object is present in the foreign object detection period when the frequency f11 is used in the first power transmission period and the frequency f10 is used in the foreign object detection period, the power transmission control circuitry sets to the inverter, the frequency f12 in the second power transmission period, and causes the inverter to start to transmit the first AC power at the frequency f12.

According to the aforementioned aspect, if it is determined that a foreign object is present when oscillation is being performed at the frequency f10, it is understood that the foreign object is present in the central section A. Thus, in the second power transmission period, for example, by transmitting power at the frequency f12, which has the magnetic field distribution of FIG. 5B in which the magnetic field of the central section A is sparse and the magnetic field of the peripheral section B is dense, power can be continuously transmitted with high efficiency while the foreign object is prevented from overheating.

[Item 4]

The power transmission device according to item 1 to 3, in which, if it is determined that the foreign object is not present in the foreign object detection period when the frequency f11 is used in the first power transmission period and the frequency f10 is used in the foreign object detection period, the power transmission control circuitry sets to the inverter, the frequency f11 in the second power transmission period, and causes the inverter to start to transmit the first AC power at the frequency f11.

According to the aforementioned aspect, if it is determined that a foreign object is not present in the foreign object detection period, f11, which is the same frequency as the frequency used in the first power transmission period, is used in the second power transmission period.

Thus, because the same frequency as in the first power transmission period is used also in the second power transmission period, processing to alter the frequency becomes unnecessary. Thus, the starting of the power transmission in the second power transmission period can be carried out quickly.

[Item 5]

The power transmission device according to item 1 to 4, in which, if it is determined that the foreign object is present in the foreign object detection period when the frequency f12 is used in the first power transmission period and the frequency f20 is used in the foreign object detection period, the power transmission control circuitry sets to the inverter, the frequency f11 in the second power transmission period, and causes the inverter to start to transmit the first AC power at the frequency f11.

According to the aforementioned aspect, if it is determined that a foreign object is present when oscillation is being performed at the frequency f20, it is understood that the foreign object is present in the peripheral section B. Thus, in the second power transmission period, for example, by transmitting power at the frequency f11, which has the magnetic field distribution of FIG. 5A in which the magnetic field of the central section A is dense and the magnetic field of the peripheral section B is sparse, power can be continuously transmitted with high efficiency while the foreign object is prevented from overheating.

[Item 6]

The power transmission device according to item 1 to 5, in which, if it is determined that the foreign object is not present in the foreign object detection period when the frequency f12 is used in the first power transmission period and the frequency f20 is used in the foreign object detection period, the power transmission control circuitry sets to the inverter, the frequency f12 in the second power transmission period, and causes the inverter to start to transmit the first AC power at the frequency f12.

According to the aforementioned aspect, if it is determined that a foreign object is not present in the foreign object detection period, f12, which is the same frequency as the frequency used in the first power transmission period, is used in the second power transmission period.

Thus, because the same frequency as in the first power transmission period is used also in the second power transmission period, processing to alter the frequency becomes unnecessary. Thus, the starting of the power transmission in the second power transmission period can be carried out quickly.

[Item 7]

The power transmission device according to any one of items 1 to 6, in which the foreign object detector measures the physical quantity in the third resonator that changes according to the second AC power, and determines that a foreign object is present between the first resonator and the third resonator when a difference between the physical quantity after having changed and a prescribed reference value is greater than a preset threshold value.

According to the aforementioned aspect, when the physical quantity in the third resonator is measured and the difference between the physical quantity after having changed and the prescribed reference value increases, it can be determined that a foreign object is present between the first resonator and the third resonator if the difference exceeds the upper limit of the prescribed range. On the other hand, when the difference decreases, it can be determined that a foreign object is present between the first resonator and the third resonator if the difference falls below the lower limit of the prescribed range.

[Item 8]

The power transmission device according to any of items 1 to 7, in which the foreign object detector measures the physical quantity in the third resonator, and determines whether or not a foreign object is present, based on a value calculated from the measured physical quantity.

According to the aforementioned aspect, the physical quantity in the third resonator is measured, and it is determined whether or not a foreign object is present, based on a value calculated from the measured physical quantity.

For example, the determination as to whether or not a foreign object is present is calculated based on an expression with which a foreign object can be determined with high precision.

For example, in a method for making the determination, it is determined that a foreign object is present between the first resonator and the third resonator when the difference between the calculated value and a reference value exceeds a prescribed range. When the difference increases, it can be determined that a foreign object is present between the first resonator and the third resonator if the difference exceeds the upper limit of the prescribed range. On the other hand, when the difference decreases, it can be determined that a foreign object is present between the first resonator and the third resonator if the difference falls below the lower limit of the prescribed range.

Thus, whether or not a foreign object is between the first resonator and the third resonator can be determined with high precision.

[Item 9]

The power transmission device according to any of items 1 to 8, in which the physical quantity in the third resonator is i) a voltage that is applied to the third resonator, ii) a current that flows in the third resonator, iii) a frequency that is applied to the third resonator, iv) an input impedance value of the third resonator, or v) an input inductance value of the third resonator.

According to the aforementioned aspect, it can be easily determined whether or not a foreign object is present between the first resonator and third resonator by measuring the physical quantity.

[Item 10]

The power transmission device according to any of items 1 to 9, in which the first resonator has a parallel resonance circuit including a coil and a capacitor, and, if the physical quantity in the third resonator is an input inductance of the third resonator, the foreign object detector is operative to;

measure i) an input inductance value Lin(f10) of the third resonator that is produced when the oscillator is oscillating at the frequency f10 and ii) an input inductance value Lin(f20) of the third resonator that is produced when the oscillator is oscillating at the frequency f20;

calculate a coupling coefficient k according to an expression $k^2=1-Lin(f20)/Lin(f10)$: and determine whether or not the foreign object is present based on the calculated coupling coefficient k.

According to the aforementioned aspect, the coupling coefficient k is calculated according to the expression $k^2=1-Lin(f20)/Lin(f10)$, and it is determined whether or not a foreign object is present, based on the calculated coupling coefficient k.

A highly precise coupling coefficient k can be calculated when the input inductance value of the third resonator that is produced when both terminals of the coil are in a shorted state is used for Lin(f20) and the input inductance value of the third resonator that is produced when both terminals of the coil are in an open state is used for Lin(f10), and a determination can be made with high precision as to whether or not a foreign object is present.

A parallel resonance circuit that includes the coil and a capacitor provided at both terminals of the coil is provided in the power reception device. Thus, when driving is performed by the oscillator at the frequency f10, which is lower than the second resonance frequency fr, a current does not flow in the capacitors, and therefore a state can be created in which both terminals of the coil are substantially open. Furthermore, when driving is performed at the frequency f20, which is higher than the second resonance frequency fr, a current flows in the capacitors, and therefore a state can be created in which both terminals of the coil are shorted.

Thus, a state in which both terminals of the coil are substantially open and a state in which both terminals of the coil are shorted can be created merely by providing a capacitor at both terminals of the coil. Therefore, it is not necessary for a shorting switch to be provided at both terminals of the coil or for a control circuit that controls the provided shorting switch to be provided in the power reception device as is ordinarily done. Thus, it is possible to eliminate the troublesomeness of sending a signal from the power transmission device to control the shorting switch as is ordinarily the case. As a result, because foreign object detection is carried out using the highly precise coupling coefficient, foreign object detection can be carried out with a simple configuration and with high precision even if the load fluctuates, without causing an increase in cost.

[Item 11]

The power transmission device according to any of items 1 to 10, in which the first resonator has a parallel resonance circuit including a coil and a capacitor, and, if the physical quantity in the third resonator is an input inductance value of the third resonator, the foreign object detector is operative to:

measure i) an input inductance value Lin(f10) of the third resonator that is produced when the oscillator is oscillating at the frequency f10 and ii) an input inductance value Lin(f20) of the third resonator that is produced when the oscillator is oscillating at the frequency f20;

calculate a ratio between the Lin(f10) and the Lin(f20); and determine whether or not the foreign object is present based on the calculated ratio.

According to the aforementioned aspect, the ratio between the measured Lin(f10) and the Lin(f20) is calculated, and it is determined whether or not a foreign object is present, based on the calculated ratio.

The meaning of "based on the ratio between the input inductance value Lin(f10) and the input inductance value Lin(f20)" is described.

Expression 1 [$k^2=1-Lin(f2)/Lin(f1)$] with which the coupling coefficient k is calculated can be modified to expression 2 [$Lin(f2)/Lin(f1)=1-k^2$]. Thus, the coupling coefficient k can be uniquely determined when Lin(f2)/Lin(f1) is determined. Consequently, whether or not a foreign object is present between the first resonator and the third resonator can be determined based on the ratio between the input inductance value Lin(f1) and the input inductance value Lin(f2).

Square root calculation processing as well as the four basic arithmetic operations is required to calculate the coupling coefficient k according to expression 1. On the other hand, because the ratio between the input inductance value Lin(f1) and the input inductance value Lin(f2) is a simple division, the processing load can also be reduced and the calculation speed can be quickened.

Furthermore, it is not necessary for a shorting switch to be provided at both terminals of the coil, and it is possible to eliminate the troublesomeness of sending a signal from the power transmission device to control the shorting switch.

[Item 12]

The power transmission device according to any of items 1 to 11, in which the first resonator has the parallel resonance circuit including the coil and the capacitor, the square of an oscillation frequency of the oscillator is inversely proportional to the input inductance value of the third resonator when the oscillator is a self-exciting oscillator and the physical quantity in the third resonator is the input inductance value of the third resonator, and the foreign object detector measures the frequency f10 and the frequency f20 at which the oscillator is oscillating, calculates the coupling coefficient k according to an expression $k^2=1-f1^2/f2^2$, and determines whether or not a foreign object is present, based on the calculated coupling coefficient k.

According to the aforementioned aspect, when the oscillator is a self-exciting oscillator, if the input inductance value is taken as L and the capacitance of the capacitor is taken as C, the frequency f of the self-exciting oscillator can be expressed by the expression $f=1/(2\pi\times(LC)^{(1/2)})$ in the case of an oscillator based on the LC resonance principle. Since the capacitance C is known by way of the circuit constant, and because the input inductance value L is inversely proportional to the square of the frequency of the oscillator, $k^2=1-Lin(f2)/Lin(f1)$, which is an expression for the coupling coefficient, can be replaced with the expression $k^2=1-f1^2/f2^2$. Thus, processing to measure the input inductance with the measurement circuit becomes unnecessary, and it is sufficient to use the values of the frequencies f1 and f2 at which the oscillator oscillates. Thus, it is no longer necessary for the input inductance to be measured by the measurement circuit, and the coupling coefficient can be calculated with high precision. It should be noted that, with regard to the values of the frequency f1 and the frequency f2, the frequency f1 and the frequency f2 of the first resonator may be measured by the measurement circuit. Furthermore, the same approach can be applied also with another oscillator and can be easily analogized by a person skilled in the art.

Furthermore, it is not necessary for a shorting switch to be provided at both terminals of the coil, and it is possible to eliminate the troublesomeness of sending a signal from the power transmission device to control the shorting switch.

[Item 13]

The power transmission device according to any of items 1 to 12, in which the first resonator and the third resonator are the same resonator, and the power transmission device further comprises a switch that switches between i) a first electrical connection between the inverter and the same resonator, and ii) a second electrical connection between the oscillator and the same resonator, by the power transmission control circuitry, wherein the power transmission control circuitry is operative to:

control the switch to switch from the first electrical connection to the second electrical connection when changing from the first power transmission period to the foreign object detection period; and control the switch to switch from the second electrical connection to the first electrical connection when changing from the foreign object detection period to the second power transmission period.

According to the aforementioned aspect, as a result of the second resonator and the third resonator being implemented as the same resonator, the resonator that transmits the first AC power to the second resonator and the resonator that transmits the second AC power to the second resonator are the same resonator, and the number of components can be reduced. A reduction in the size of the power transmission device can then be achieved.

[Item 14]

The power transmission device according to any of items 1 to 13, in which the power receiving device has a power receiving circuit, the power receiving circuit converting the received first AC power to first DC power and supplying the first DC power to a load.

[Item 15]

A wireless power transmission system provided with the power transmission device according to any of items 1 to 14, and a power reception device.

[Item 16]

A power transmission device that transmits first AC power by a non-contact method to a power reception device provided with a first resonator that receives the first AC power and a power reception circuit that converts the first AC power received by the first resonator into a first DC power and supplies the first DC power to a load, the power transmission device being provided with: a second resonator that electromagnetically couples with the first resonator to transmit the first AC power to the first resonator; a third resonator that electromagnetically couples with the first resonator to transmit a second AC power to the first resonator; an inverter that uses a frequency f11, which is lower than a first resonance frequency f0 between the first resonator and the second resonator, or a frequency f12, which is higher than the first resonance frequency f0, to generate the first AC power; an oscillator that uses a frequency f10, which is lower than a second resonance frequency fr between the first resonator and the third resonator, or a frequency f20, which is higher than the second resonance frequency fr, to generate the second AC power, which is smaller than the first AC power; a foreign object detector that instructs the oscillator such that the second AC power of either one of the frequency f10 or the frequency f20 is generated from the oscillator, and determines whether or not a foreign object is present between the first resonator and the third resonator, based on a physical quantity in the third resonator that changes according to the second AC power; and a power transmission control circuitry that designates either one of the frequency f11 or the frequency f12 for the inverter and causes the inverter to generate the first AC power, in which the power transmission control circuitry provides a foreign object detection period in which the foreign object detector is made to determine whether or not a foreign object is present, before the first AC power is transmitted, uses either one of the frequency f10 and the frequency f20 in the foreign object detection period, instructs the inverter to use the frequency f11, which is lower than the first resonance frequency f0, if it is determined that a foreign object is present in the foreign object detection period using the frequency f20, which is higher than the second resonance frequency fr, or instructs the inverter to use the frequency f12, which is higher than the first resonance frequency f0, if it is determined that a foreign object is present in the foreign object detection period using the frequency f10, which is lower than the second resonance frequency fr, and causes transmission of the first AC power to be started.

In the first aspect, a foreign object detection period in which foreign object detection is performed by the foreign object detector is provided between a first power transmission period in which the first AC power is transmitted from the second resonator to the first resonator and a second power transmission period that is subsequent to the first power transmission period; however, according to the aforementioned item, the present disclosure can be applied also when the first power transmission period is first provided after the foreign object detection period.

Either one of the frequency f10 and the frequency f20 is used in the foreign object detection period.

If oscillation is being performed at the frequency f10 in the foreign object detection period, the magnetic field of the central section A between the coil of the second resonator and the coil of the third resonator becomes dense and the magnetic field of the peripheral section B becomes sparse, as depicted in FIG. 5A.

Thus, if it is determined that a foreign object is present when oscillation is being performed at the frequency f20, it is understood that the foreign object is present in the peripheral section B. Thus, in the second power transmission period, by transmitting power at the frequency f11, which has a magnetic field distribution in which the magnetic field of the central section A is dense and the magnetic field of the peripheral section B is sparse, power can be continuously transmitted with high efficiency while the foreign object is prevented from overheating.

If oscillation is being performed at the frequency f20 in the foreign object detection period, the magnetic field of the peripheral section B between the coil of the second resonator and the coil of the third resonator becomes dense and the magnetic field of the central section A becomes sparse, as depicted in FIG. 5B.

Thus, if it is determined that a foreign object is present when oscillation is being performed at the frequency f10, it is understood that the foreign object is present in the central section A. Thus, in the second power transmission period, by transmitting power at the frequency f12, which has a magnetic field distribution in which the magnetic field of the central section A is sparse and the magnetic field of the peripheral section B is dense, power can be continuously transmitted with high efficiency while the foreign object is prevented from overheating.

Furthermore, because the power transmission device can be realized with only one power transmission coil, power can be transmitted even with a power reception device having one power reception coil such as a smartphone, and a power transmission device that has an installation base having a small area can be realized.

[Item 16]

The power transmission device according to item 15, in which the foreign object detector measures the physical quantity in the third resonator that changes according to the second AC power, and determines that a foreign object is present between the first resonator and the third resonator when a difference between the physical quantity after having changed and a prescribed reference value is greater than a preset threshold value.

According to the aforementioned item, when the difference between the physical quantity after having changed and the prescribed reference value becomes greater than the preset threshold value, it is determined that a foreign object is present between the first resonator and the third resonator.

Thus, it can be easily determined whether or not a foreign object is between the first resonator and the third resonator.

[Item 17]

The power transmission device according to any of items 15 and 16, in which the foreign object detector measures the physical quantity in the third resonator, and determines whether or not a foreign object is present, based on a value calculated from the measured physical quantity.

According to the aforementioned aspect, whether or not a foreign object is present is determined based on a value calculated from the measured physical quantity. The calculated value is calculated based on an expression with which a foreign object can be determined with high precision. Thus, whether or not a foreign object is between the first resonator and the third resonator can be determined with high precision.

[Item 18]

The power transmission device according to any of items 15 to 17, in which the physical quantity in the third resonator is a voltage that is applied to the third resonator, a current that flows in the third resonator, a frequency that is applied to the third resonator, an input impedance value of the third resonator, or an input inductance value of the third resonator.

According to the aforementioned item, whether or not a foreign object is present between the first resonator and the third resonator can be easily determined by measuring the physical quantity.

[Item 19]

The power transmission device according to any of items 15 to 18, in which the first resonator has a parallel resonance circuit including a coil and a capacitor, and, if the physical quantity in the third resonator is an input inductance of the third resonator, the foreign object detector measures an input inductance value $Lin(f10)$ of the third resonator that is produced when the oscillator is oscillating at the frequency f10 and an input inductance value $Lin(f20)$ of the third resonator that is produced when the oscillator is oscillating at the frequency f20, calculates a coupling coefficient k according to an expression $k^2=1-Lin(f20)/Lin(f10)$, and determines whether or not a foreign object is present, based on the calculated coupling coefficient k.

According to the aforementioned item, the coupling coefficient k is calculated according to the expression $k^2=1-Lin(f20)/Lin(f10)$, and it is determined whether or not a foreign object is present, based on the calculated coupling coefficient k.

A highly precise coupling coefficient k can be calculated when the input inductance value of the third resonator that is produced when both terminals of the coil are in a shorted state is used for $Lin(f20)$ and the input inductance value of the third resonator that is produced when both terminals of the coil are in an open state is used for $Lin(f10)$, and a determination can be made with high precision as to whether or not a foreign object is present.

A parallel resonance circuit that includes the coil and a capacitor provided at both terminals of the coil is provided in the power reception device. Thus, when driving is performed by the oscillator at the frequency f10, which is lower than the second resonance frequency fr, a current does not flow in the capacitors, and therefore a state can be created in which both terminals of the coil are substantially open. Furthermore, when driving is performed at the frequency f20, which is higher than the second resonance frequency fr, a current flows in the capacitors, and therefore a state can be created in which both terminals of the coil are shorted.

Thus, a state in which both terminals of the coil are substantially open and a state in which both terminals of the coil are shorted can be created merely by providing a capacitor at both terminals of the coil. Therefore, it is not necessary for a shorting switch to be provided at both terminals of the coil or for a control circuit that controls the provided shorting switch to be provided in the power reception device as is ordinarily done. Thus, it is possible to eliminate the troublesomeness of sending a signal from the power transmission device to control the shorting switch as is ordinarily the case. As a result, because foreign object detection is carried out using the highly precise coupling coefficient, foreign object detection can be carried out with a simple configuration and with high precision even if the load fluctuates, without causing an increase in cost.

[Item 20]

The power transmission device according to any of items 15 to 19, in which the first resonator has the parallel resonance circuit including the coil and the capacitor, and, if the physical quantity in the third resonator is the input inductance value of the third resonator, the foreign object detector measures the input inductance value Lin(f10) of the third resonator that is produced when the oscillator is oscillating at the frequency f10 and the input inductance value Lin(f20) of the third resonator that is produced when the oscillator is oscillating at the frequency f20, calculates a ratio between the Lin(f10) and the Lin(f20), and determines whether or not a foreign object is present, based on the calculated ratio.

According to the aforementioned item, the ratio between the measured Lin(f10) and the Lin(f20) is calculated, and it is determined whether or not a foreign object is present, based on the calculated ratio.

The meaning of "based on the ratio between the input inductance value Lin(f10) and the input inductance value Lin(f20)" is described.

Expression 1 [$k^2 = 1 - \text{Lin}(f2)/\text{Lin}(f1)$] with which the coupling coefficient k is calculated can be modified to expression 2 [$\text{Lin}(f2)/\text{Lin}(f1) = 1 - k^2$]. Thus, the coupling coefficient k can be uniquely determined when Lin(f2)/Lin(f1) is determined. Consequently, whether or not a foreign object is present between the first resonator and the third resonator can be determined based on the ratio between the input inductance value Lin(f1) and the input inductance value Lin(f2).

Square root calculation processing as well as the four basic arithmetic operations is required to calculate the coupling coefficient k according to expression 1. On the other hand, because the ratio between the input inductance value Lin(f1) and the input inductance value Lin(f2) is a simple division, the processing load can also be reduced and the calculation speed can be quickened.

Furthermore, it is not necessary for a shorting switch to be provided at both terminals of the coil, and it is possible to eliminate the troublesomeness of sending a signal from the power transmission device to control the shorting switch.

[Item 21]

The power transmission device according to any of items 15 to 20, in which the first resonator has the parallel resonance circuit including the coil and the capacitor, the square of the oscillation frequency of the oscillator is inversely proportional to the input inductance value of the third resonator when the oscillator is a self-exciting oscillator and the physical quantity in the third resonator is the input inductance value of the third resonator, and the foreign object detector measures the frequency f10 and the frequency f20 at which the oscillator is oscillating, calculates the coupling coefficient k according to an expression $k^2 = 1 - f1^2/f2^2$, and determines whether or not a foreign object is present, based on the calculated coupling coefficient k.

According to the aforementioned item, when the oscillator is a self-exciting oscillator, if the input inductance value is taken as L and the capacitance of the capacitor is taken as C, the frequency f of the self-exciting oscillator can be expressed by the expression $f = 1/(2\pi \times (LC)^{(1/2)})$ in the case of an oscillator based on the LC resonance principle. Since the capacitance C is known by way of the circuit constant, and because the input inductance value L is inversely proportional to the square of the frequency of the oscillator, $k^2 = 1 - \text{Lin}(f2)/\text{Lin}(f1)$, which is an expression for the coupling coefficient, can be replaced with the expression $k^2 = 1 - f1^2/f2^2$. Thus, processing to measure the input inductance with the measurement circuit becomes unnecessary, and it is sufficient to use the values of the frequencies f1 and f2 at which the oscillator oscillates. Thus, it is no longer necessary for the input inductance to be measured by the measurement circuit, and the coupling coefficient can be calculated with high precision. It should be noted that, with regard to the values of the frequency f1 and the frequency f2, the frequency f1 and the frequency f2 of the first resonator may be measured by the measurement circuit. Furthermore, the same approach can be applied also with another oscillator and can be easily analogized by a person skilled in the art.

Furthermore, it is not necessary for a shorting switch to be provided at both terminals of the coil, and it is possible to eliminate the troublesomeness of sending a signal from the power transmission device to control the shorting switch.

[Item 22]

The power transmission device according to any of items 15 to 21, in which the second resonator and the third resonator are the same resonator and are provided with a switch that switches between an electrical connection between the inverter and the same resonator and an electrical connection between the oscillator and the same resonator by control performed by the power transmission control circuitry, and the power transmission control circuitry controls the switch to switch from the electrical connection between the inverter and the same resonator to the electrical connection between the oscillator and the same resonator when changing from the first power transmission period to the foreign object detection period, and controls the switch to switch from the electrical connection between the oscillator and the same resonator to the electrical connection between the inverter and the same resonator when changing from the foreign object detection period to the second power transmission period.

According to the aforementioned item, as a result of the second resonator and the third resonator being implemented as the same resonator, the resonator that transmits the first AC power to the second resonator and the resonator that transmits the second AC power to the second resonator are the same resonator, and the number of components can be reduced. A reduction in the size of the power transmission device can then be achieved.

[Item 23]

A wireless power transmission system provided with the power transmission device according to any of items 15 to 22, and the power reception device.

Furthermore, a power transmission device, a power reception device, and a wireless power transmission system provided with the power transmission device and the power reception device according to another aspect of the present disclosure are provided with the following configurations.

(1) A wireless power transmission system according to one aspect of the present disclosure is provided with: a power transmission circuit configured to convert input DC energy into AC energy and output the AC energy; a first resonator configured to resonate at a frequency f0 and to send out the AC energy output from the power transmission circuit; a second resonator configured to resonate at the frequency f0 and a frequency fr and to electromagnetically couple with the first resonator to receive at least some of the AC energy sent out from the first resonator; a power reception circuit configured to convert the AC energy received by the second resonator into DC energy and supply the DC energy to a load; and a third resonator configured to resonate at the frequency fr and to electromagnetically couple with the second resonator. The power transmission circuit has: an inverter configured to have a plurality of switches and to convert input DC energy into AC energy by switching the plurality of switches and output the AC energy to the first resonator; a power transmission control circuitry configured to control the switching of the plurality of switches in the inverter; an oscillator that is connected to the third resonator and is capable of oscillating at at least one of a frequency f10, which is lower than the frequency fr, and a frequency f20, which is higher than the frequency fr; a measurement circuit configured to measure a physical quantity that changes according to a voltage that is output from the oscillator; and a determination circuit configured to instruct the power transmission control circuitry such that power is transmitted at a frequency f21, which is higher than the frequency f0, when the oscillator is oscillating at the frequency f10 and an amount of change from a reference value for the measured physical quantity is greater than a preset threshold value, and to instruct the power transmission control circuitry such that power is transmitted at a frequency f11, which is lower than the frequency f0, when the oscillator is oscillating at the frequency f20 and the amount of change from the reference value for the physical quantity is greater than the preset threshold value.

(2) In an embodiment, the power transmission control circuitry is configured such that the oscillator is made to oscillate at both of the frequencies f10 and f20, and the determination circuit is configured to instruct the power transmission control circuitry such that power is transmitted at the frequency f21 when the amount of change from the reference value for the physical quantity that occurs when the oscillator is oscillating at the frequency f10 is greater than the threshold value and is greater than the amount of change from the reference value for the physical quantity that occurs when the oscillator is oscillating at the frequency f20, and to instruct the power transmission control circuitry such that power is transmitted at the frequency f11 when the amount of change from the reference value for the physical quantity that occurs when the oscillator is oscillating at the frequency f20 is greater than the threshold value and is greater than the amount of change from the reference value for the physical quantity that occurs when the oscillator is oscillating at the frequency f10.

(3) In an embodiment, the determination circuit is configured to output information indicating that a foreign object has approached the third resonator or the second resonator, when the amount of change from the reference value for the physical quantity that is produced when the oscillator is oscillating at least one of the frequencies f10 and f20 is greater than the threshold value.

(4) In an embodiment, the determination circuit is configured to determine whether or not a foreign object is present, based on a ratio between an input inductance value $Lin(f10)$ of the third resonator that is produced when the oscillator is oscillating at the frequency f10, which is lower than the frequency fr, and an input inductance value $Lin(f20)$ of the third resonator that is produced when the oscillator is oscillating at the frequency f20, which is higher than the frequency fr.

(5) In an embodiment, the determination circuit is configured to determine whether or not a foreign object is present, based on a coupling coefficient k calculated according to an expression $k^2=1-Lin(f20)/Lin(f10)$ or a correction expression based on the expression.

(6) In an embodiment, the oscillator is a self-exciting oscillator and is configured such that an input inductance value of the third resonator is inversely proportional to the square of the resonance frequency of the oscillator, and the determination circuit is configured to determine whether or not a foreign object is present, based on a coupling coefficient k calculated according to an expression $k^2=1-f1^2/f2^2$ or a correction expression based on the expression.

(7) In an embodiment, the first resonator and the third resonator are configured of one resonator. The wireless power transmission system is additionally provided with a switch connected between the oscillator and the resonator, and a control circuit configured to set the switch to on in a foreign object detection mode and set the switch to off in a power transmission mode.

(8) A wireless power transmission system according to another aspect of the present disclosure is provided with: a power transmission circuit configured to convert input DC energy into AC energy and output the AC energy; a first resonator configured to resonate at a frequency f0 and to send out the AC energy output from the power transmission circuit; a second resonator configured to resonate at the frequency f0 and a frequency fr and to electromagnetically couple with the first resonator to receive at least some of the AC energy sent out from the first resonator; a power reception circuit configured to convert the AC energy received by the second resonator into DC energy and supply the DC energy to a load; and a third resonator configured to resonate at the frequency fr and to electromagnetically couple with the second resonator. The power transmission circuit has: an inverter configured to have a plurality of switches and to convert input DC energy into AC energy by switching the plurality of switches and output the AC energy to the first resonator; an oscillator that is connected to the third resonator and outputs a voltage including an AC component; a measurement circuit configured to measure a physical quantity that changes according to the voltage that is output from the oscillator; a determination circuit configured to determine whether or not a foreign object is present, based on the amount of change from a reference value for the measured physical quantity; and a power transmission control circuitry configured to, during power transmission, control at least one of a frequency of the voltage output from the inverter and a duty cycle of the voltage, record a control parameter relating to at least one of the frequency and the duty ratio in a memory, and, when power transmission is restarted after determination processing by the determination circuit has been carried out, use the control parameter, which is determined based on a result of the determination processing, to control the inverter.

(9) In an embodiment, the power transmission control circuitry is configured to use the control parameter recorded in the memory to control the inverter when a foreign object is not detected by the determination circuit.

(10) In an embodiment, the determination circuit is configured to instruct the power transmission control circuitry such that power is transmitted at the frequency f21, which is higher than the frequency f0, when the determination circuit has determined that there is a foreign object when the oscillator is oscillating at the frequency f10, which is lower than the frequency fr.

(11) In an embodiment, the determination circuit is configured to instruct the power transmission control circuitry such that power is transmitted at the frequency f11, which is lower than the frequency f0, when the determination circuit has determined that there is a foreign object when the oscillator is oscillating at the frequency f20, which is higher than the frequency fr.

(12) In an embodiment, the determination circuit is configured to instruct the power transmission control circuitry such that power is transmitted at the frequency f21, which is higher than the frequency f0, when the oscillator is oscillating at the frequency f10 and the amount of change from the reference value for the measured physical quantity is greater than a preset threshold value, and to instruct the power transmission control circuitry such that power is transmitted at the frequency f11, which is lower than the frequency f0, when the oscillator is oscillating at the frequency f20 and the amount of change from the reference value for the physical quantity is greater than the preset threshold value.

(13) In an embodiment, the determination circuit is configured to determine whether or not a foreign object is present, based on an input inductance value of the third resonator that is produced when the oscillator is oscillating.

(14) In an embodiment, the determination circuit is configured to determine whether or not a foreign object is present, based on a ratio between an input inductance value Lin(f10) of the third resonator that is produced when the oscillator is oscillating at the frequency f10, which is lower than the frequency fr, and an input inductance value Lin(f20) of the third resonator that is produced when the oscillator is oscillating at the frequency f20, which is higher than the frequency fr.

(15) In an embodiment, the determination circuit is configured to determine whether or not a foreign object is present, based on a coupling coefficient k calculated according to an expression $k^2=1-Lin(f20)/Lin(f10)$ or a correction expression based on the expression.

(16) In an embodiment, the oscillator is a self-exciting oscillator and is configured such that an input inductance value of the third resonator is inversely proportional to the square of the resonance frequency of the oscillator, and the determination circuit is configured to determine whether or not a foreign object is present, based on a coupling coefficient k calculated according to an expression $k^2=1-f1^2/f2^2$ or a correction expression based on the expression.

(17) In an embodiment, the power transmission control circuitry is configured to start power transmission using a control parameter obtained by correcting the control parameter recorded in the memory, when the determination circuit determines that there is no foreign object and a difference between the coupling coefficient k and a design value is equal to or greater than a prescribed threshold value.

(18) In an embodiment, the first resonator and the third resonator are configured of one resonator. The power transmission device is additionally provided with a switch connected between the oscillator and the resonator, and a control circuit configured to set the switch to on in a foreign object detection mode and set the switch to off in a power transmission mode.

(19) A power transmission device according to another aspect of the present disclosure is provided with: a power transmission circuit configured to convert input DC energy into AC energy and output the AC energy; a first resonator configured to resonate at a frequency f0 and to send out the AC energy output from the power transmission circuit; and a third resonator configured to resonate at a frequency fr and to electromagnetically couple with a second resonator mounted in a power reception device. The power transmission circuit has: an inverter configured to have a plurality of switches and to convert input DC energy into AC energy by switching the plurality of switches and output the AC energy to the first resonator; a power transmission control circuitry configured to control the switching of the plurality of switches in the inverter; an oscillator that is connected to the third resonator and is capable of oscillating at at least one of a frequency f10, which is lower than the frequency fr, and a frequency f20, which is higher than the frequency fr; a measurement circuit configured to measure a physical quantity that changes according to a voltage that is output from the oscillator; and a determination circuit configured to instruct the power transmission control circuitry such that power is transmitted at a frequency f21, which is higher than the frequency f0, when the oscillator is oscillating at the frequency f10 and an amount of change from a reference value for the measured physical quantity is greater than a preset threshold value, and to instruct the power transmission control circuitry such that power is transmitted at a frequency f11, which is lower than the frequency f0, when the oscillator is oscillating at the frequency f20 and the amount of change from the reference value for the physical quantity is greater than the preset threshold value.

(20) A power transmission device according to another aspect of the present disclosure is provided with: a power transmission circuit configured to convert input DC energy into AC energy and output the AC energy; a first resonator configured to resonate at a frequency f0 and to send out the AC energy output from the power transmission circuit; and a third resonator configured to resonate at a frequency fr and to electromagnetically couple with a second resonator mounted in a power reception device. The power transmission circuit has: an inverter configured to have a plurality of switches and to convert input DC energy into AC energy by switching the plurality of switches and output the AC energy to the first resonator; an oscillator that is connected to the third resonator and outputs a voltage including an AC component; a measurement circuit configured to measure a physical quantity that changes according to the voltage that is output from the oscillator; a determination circuit configured to determine whether or not a foreign object is present, based on the amount of change from a reference value for the measured physical quantity; and a power transmission control circuitry configured to, during power transmission, control at least one of a frequency of the voltage output from the inverter and an output time ratio of the voltage, record a control parameter relating to at least one of the frequency and the output time ratio in a memory, and, when power transmission is restarted after determination processing by the determination circuit has been carried out, use the control parameter, which is determined based on a result of the determination processing, to control the inverter.

(21) A wireless power transmission system according to another aspect of the present disclosure is provided with: a power transmission circuit configured to convert input DC energy into AC energy and output the AC energy; a first resonator configured to resonate at frequencies f0 and fr and to send out the AC energy output from the power transmission circuit; a second resonator configured to resonate at the frequency f0 and to receive at least some of the AC energy sent out from the first resonator by electromagnetically coupling with the first resonator; a power reception circuit configured to convert the AC energy received by the second resonator into DC energy and supply the DC energy to a load; and a third resonator configured to resonate at the frequency fr and to electromagnetically couple with the first resonator. The power transmission circuit has: an inverter configured to have a plurality of switches and to convert input DC energy into AC energy by switching the plurality of switches and output the AC energy to the first resonator; and a power transmission control circuitry configured to control the switching of the plurality of switches in the inverter. The power reception circuit has: an oscillator that is connected to the third resonator and is capable of oscillating at at least one of a frequency f10, which is lower than the resonance frequency fr, and a frequency f20, which is higher than the resonance frequency fr; a measurement circuit configured to measure a physical quantity that changes according to a voltage that is output from the oscillator; and a determination circuit configured to instruct the power transmission control circuitry such that power is transmitted at a frequency f21, which is higher than the frequency f0, when the oscillator is oscillating at the frequency f10 and an amount of change from a reference value for the measured physical quantity is greater than a preset threshold value, and to instruct the power transmission control circuitry such that power is transmitted at a frequency f11, which is lower than the frequency f0, when the oscillator is oscillating at the frequency f20 and the amount of change from the reference value for the physical quantity is greater than the preset threshold value.

(22) A wireless power transmission system according to another aspect of the present disclosure has: a power transmission circuit configured to convert input DC energy into AC energy and output the AC energy; a first resonator configured to resonate at frequencies f0 and fr and to send out the AC energy output from the power transmission circuit; a second resonator configured to resonate at the frequency f0 and to receive at least some of the AC energy sent out from the first resonator by electromagnetically coupling with the first resonator; a power reception circuit configured to convert the AC energy received by the second resonator into DC energy and supply the DC energy to a load; and a third resonator configured to resonate at the frequency fr and to electromagnetically couple with the first resonator. The power reception circuit has a measurement circuit is configured to measure a physical quantity that changes according to the voltage that is output from the oscillator, and a determination circuit configured to determine whether or not a foreign object is present, based on the amount of change from a reference value for the measured physical quantity. The power transmission circuit has: an inverter configured to have a plurality of switches and to convert input DC energy into AC energy by switching the plurality of switches and output the AC energy to the first resonator; an oscillator that is connected to the third resonator and outputs a voltage including an AC component; and a power transmission control circuitry configured to, during power transmission, control at least one of a frequency of the voltage that is output from the inverter and an output time ratio of the voltage, record a control parameter relating to at least one of the frequency and the output time ratio in a memory, and, when power transmission is restarted after determination processing by the determination circuit has been carried out, use the control parameter, which is determined based on a result of the determination processing, to control the inverter.

(23) A power reception circuit according to another aspect of the present disclosure is provided with: a second resonator configured to resonate at a frequency f0 and to receive at least some AC energy sent out from a first resonator, which is mounted in a power transmission device, by electromagnetically coupling with the first resonator; a power reception circuit configured to convert the AC energy received by the second resonator into DC energy and supply the DC energy to a load; and a third resonator configured to resonate at a frequency fr and to electromagnetically couple with the first resonator. The power reception circuit has: an oscillator that is connected to the third resonator and is capable of oscillating at at least one of a frequency f10, which is lower than the resonance frequency fr, and a frequency f20, which is higher than the resonance frequency fr; a measurement circuit configured to measure a physical quantity that changes according to a voltage that is output from the oscillator; and a determination circuit configured to instruct the power transmission control circuitry such that power is transmitted at a frequency f21, which is higher than the frequency f0, when the oscillator is oscillating at the frequency f10 and an amount of change from a reference value for the measured physical quantity is greater than a preset threshold value, and to instruct the power transmission control circuitry such that power is transmitted at a frequency f11, which is lower than the frequency f0, when the oscillator is oscillating at the frequency f20 and the amount of change from the reference value for the physical quantity is greater than the preset threshold value.

The wireless power transmission system of the present disclosure can be widely applied in applications in which power is charged or supplied to an electric automobile, an AV device, a battery, or a medical device or the like. According to the embodiments of the present disclosure, it is possible to avoid the risk of an abnormal generation of heat by a metal that is present between power transmission/reception coils. It is also possible to reduce a decline in efficiency that accompanies foreign object detection processing.

What is claimed is:

1. A power transmission device that transmits first AC power wirelessly to a power receiving device having a first resonator, the first resonator receiving the first AC power, the power transmission device comprising:
    a second resonator that electromagnetically couples with the first resonator to transmit the first AC power to the first resonator;
    an inverter that generates the first AC power by using either a frequency f11 or a frequency f12, the frequency f11 being lower than a first resonance frequency f0 between the first resonator and the second resonator, and the frequency f12 being higher than the first resonance frequency f0;
    an oscillator that generates second AC power by using either a frequency f10 or a frequency f20, the frequency f10 being lower than a second resonance frequency fr between the first resonator and the second resonator, the frequency f20 being higher than the second resonance frequency fr;
    a foreign object detector that determines whether or not a foreign object is present between the first resonator and the second resonator based on a physical quantity in the second resonator that changes according to the second AC power of either the frequency f10 or the frequency f20; and
    a power transmission control circuitry configured to:
    set a foreign object detection period in which the foreign object is detected by the foreign object detector, between i) a first power transmission period in which the first AC power is transmitted from the second resonator to the first resonator and ii) a second power transmission period subsequent to the first power transmission period;

set, to the inverter, one of the frequency f11 or the frequency f12 in the first power transmission period; and set, to the inverter, other of the frequency f11 or the frequency f12 in the second power transmission period if it is determined that the foreign object is present in the foreign object detection period.

2. The power transmission device according to claim 1, wherein, if it is determined that the foreign object is not present in the foreign object detection period, the power transmission control circuitry sets to the inverter, in the second power transmission period, the frequency f11 or the frequency f12 that is same frequency as frequency used in the first power transmission period, and causes the inverter to start to transmit the first AC power at the set one of the frequency f11 and the frequency f12.

3. The power transmission device according to claim 1, wherein, if it is determined that the foreign object is present in the foreign object detection period when the frequency f11 is used in the first power transmission period and the frequency f10 is used in the foreign object detection period, the power transmission control circuitry sets to the inverter, the frequency f12 in the second power transmission period, and causes the inverter to start to transmit the first AC power at the frequency f12.

4. The power transmission device according to claim 2, wherein, if it is determined that the foreign object is not present in the foreign object detection period when the frequency f11 is used in the first power transmission period and the frequency f10 is used in the foreign object detection period, the power transmission control circuitry sets to the inverter, the frequency f11 in the second power transmission period, and causes the inverter to start to transmit the first AC power at the frequency f11.

5. The power transmission device according to claim 1, wherein, if it is determined that the foreign object is present in the foreign object detection period when the frequency f12 is used in the first power transmission period and the frequency f20 is used in the foreign object detection period, the power transmission control circuitry sets to the inverter, the frequency f11 in the second power transmission period, and causes the inverter to start to transmit the first AC power at the frequency f11.

6. The power transmission device according to claim 2, wherein, if it is determined that the foreign object is not present in the foreign object detection period when the frequency f12 is used in the first power transmission period and the frequency f20 is used in the foreign object detection period, the power transmission control circuitry sets to the inverter, the frequency f12 in the second power transmission period, and causes the inverter to start to transmit the first AC power at the frequency f12.

7. The power transmission device according to claim 1, wherein the foreign object detector measures the physical quantity in the second resonator that changes according to the second AC power, and determines that a foreign object is present between the first resonator and the second resonator when a difference between the physical quantity after having changed and a prescribed reference value is greater than a preset threshold value.

8. The power transmission device according to claim 1, wherein the foreign object detector measures the physical quantity in the second resonator, and determines whether or not a foreign object is present, based on a value calculated from the measured physical quantity.

9. The power transmission device according to claim 8, wherein the physical quantity in the second resonator is i) a voltage that is applied to the second resonator, ii) a current that flows in the second resonator, iii) a frequency that is applied to the second resonator, iv) an input impedance value of the second resonator, or v) an input inductance value of the second resonator.

10. The power transmission device according to claim 1, wherein the first resonator has a parallel resonance circuit including a coil and a capacitor, and, if the physical quantity in the second resonator is an input inductance of the second resonator, the foreign object detector is configured to;

measure i) an input inductance value Lin(f10) of the second resonator that is produced when the oscillator is oscillating at the frequency f10 and ii) an input inductance value Lin(f20) of the second resonator that is produced when the oscillator is oscillating at the frequency f20;

calculate a coupling coefficient k according to an expression $k^2=1-Lin(f20)/Lin(f10)$: and determine whether or not the foreign object is present based on the calculated coupling coefficient k.

11. The power transmission device according to claim 1, wherein the first resonator has a parallel resonance circuit including a coil and a capacitor, and, if the physical quantity in the second resonator is an input inductance value of the second resonator, the foreign object detector is configured to:

measure i) an input inductance value Lin(f10) of the second resonator that is produced when the oscillator is oscillating at the frequency f10 and ii) an input inductance value Lin(f20) of the second resonator that is produced when the oscillator is oscillating at the frequency f20;

calculate a ratio between the Lin(f10) and the Lin(f20); and determine whether or not the foreign object is present based on the calculated ratio.

12. The power transmission device according to claim 1, wherein the first resonator has a parallel resonance circuit including a coil and a capacitor, squaring of an oscillation frequency of the oscillator is inversely proportional to an input inductance value of the second resonator, when the oscillator is a self-exciting oscillator and when the physical quantity in the second resonator is the input inductance value of the second resonator, and the foreign object detector is configured to:

measure the frequency f10 and the frequency f20 at which the oscillator is oscillating;

calculate a coupling coefficient k according to an expression $k^2=1-f1^2/f2^2$; and determine whether or not a foreign object is present based on the calculated coupling coefficient k.

13. The power transmission device according to claim 1, wherein,
the power receiving device has a power receiving circuit, the power receiving circuit converting the received first AC power to DC power and supplying the DC power to a load.

14. A wireless power transmission system provided with the power transmission device according to claim 1, and a power reception device.

* * * * *